United States Patent
Palmieri et al.

(10) Patent No.: US 10,549,516 B2
(45) Date of Patent: Feb. 4, 2020

(54) OFF-SET RESIN FORMULATIONS AND BLOCKING/DEBLOCKING RESIN SYSTEMS FOR USE AS A "CO-CURE-PLY" IN THE FABRICATION OF LARGE-SCALE COMPOSITE STRUCTURE

(71) Applicant: United States of America as represented by the Administrator of NASA, Washington, DC (US)

(72) Inventors: Frank L. Palmieri, Hampton, VA (US); John W. Connell, Yorktown, VA (US); Christopher J. Wohl, Jr., Portsmouth, VA (US)

(73) Assignee: UNITED STATES OF AMERICA AS REPRESENTED BY THE ADMINISTRATOR OF NASA, Washington, DC (US)

( * ) Notice: Subject to any disclaimer, the term of this patent is extended or adjusted under 35 U.S.C. 154(b) by 148 days.

(21) Appl. No.: 15/699,433

(22) Filed: Sep. 8, 2017

(65) Prior Publication Data

US 2017/0368812 A1 Dec. 28, 2017

Related U.S. Application Data

(63) Continuation-in-part of application No. 15/274,147, filed on Sep. 23, 2016, now Pat. No. 10,369,767.
(Continued)

(51) Int. Cl.
*B32B 27/38* (2006.01)
*B32B 27/34* (2006.01)
(Continued)

(52) U.S. Cl.
CPC .............. *B32B 27/38* (2013.01); *B29C 65/02* (2013.01); *B29C 65/4835* (2013.01);
(Continued)

(58) Field of Classification Search
None
See application file for complete search history.

(56) References Cited

U.S. PATENT DOCUMENTS

| | | | | |
|---|---|---|---|---|
| 4,623,681 A | * | 11/1986 | Hirschbuehler ... | C07D 207/404 523/400 |
| 2015/0056433 A1 | * | 2/2015 | MacAdams ............... | B32B 7/06 428/221 |
| 2016/0121591 A1 | | 5/2016 | MacAdams et al. | |

OTHER PUBLICATIONS

Center for Independent Research & Developments: LaRC IRAD Program, "Co-Cure-Poly Resins for High Performance. Large-Scale Structures Project." Oct. 23, 2015, 5 pages.

* cited by examiner

*Primary Examiner* — Randy P Gulakowski
*Assistant Examiner* — Ha S Nguyen
(74) *Attorney, Agent, or Firm* — Jennifer L. Riley; Robin W. Edwards

(57) ABSTRACT

A method for bonding composite substrates includes coupling a first co-cure prepreg layer having a first off-set amine to epoxide molar ratio onto a surface of a first composite substrate and coupling a second co-cure prepreg layer having a second off-set amine to epoxide molar ratio onto a surface of a second composite substrate. The first and second composite substrates are cured to the first and second co-cure prepreg layers, respectively, using a first cure cycle (including B-stage and cure temperatures) to form a first and a second co-cure prepreg layer portion. The method further includes coupling the first co-cure prepreg layer portion to the second co-cure prepreg layer portion and applying a second cure cycle to cure the first co-cure prepreg layer portion of the first composite substrate to the second co-cure prepreg layer portion of the second composite substrate to form a monolithic covalently bonded composite structure.

20 Claims, 14 Drawing Sheets

Related U.S. Application Data

(60) Provisional application No. 62/385,012, filed on Sep. 8, 2016, provisional application No. 62/222,365, filed on Sep. 23, 2015.

(51) Int. Cl.

| | |
|---|---|
| *B32B 37/14* | (2006.01) |
| *B32B 5/02* | (2006.01) |
| *B32B 5/26* | (2006.01) |
| *B32B 27/08* | (2006.01) |
| *B32B 27/12* | (2006.01) |
| *B32B 27/18* | (2006.01) |
| *B32B 27/20* | (2006.01) |
| *B32B 27/26* | (2006.01) |
| *B32B 27/28* | (2006.01) |
| *B32B 27/36* | (2006.01) |
| *B32B 27/40* | (2006.01) |
| *B32B 27/42* | (2006.01) |
| *B29C 65/00* | (2006.01) |
| *B29C 65/48* | (2006.01) |
| *B29C 65/50* | (2006.01) |
| *B32B 7/12* | (2006.01) |
| *B29C 70/30* | (2006.01) |
| *B29C 65/02* | (2006.01) |
| *C09J 5/06* | (2006.01) |
| *B29C 65/14* | (2006.01) |

(52) U.S. Cl.
CPC ...... *B29C 65/5014* (2013.01); *B29C 65/5057* (2013.01); *B29C 66/0242* (2013.01); *B29C 66/1122* (2013.01); *B29C 66/43* (2013.01); *B29C 66/71* (2013.01); *B29C 66/721* (2013.01); *B29C 66/73752* (2013.01); *B29C 66/73754* (2013.01); *B29C 66/73941* (2013.01); *B29C 66/919* (2013.01); *B29C 66/91445* (2013.01); *B29C 66/91921* (2013.01); *B29C 70/30* (2013.01); *B32B 5/022* (2013.01); *B32B 5/024* (2013.01); *B32B 5/026* (2013.01); *B32B 5/26* (2013.01); *B32B 7/12* (2013.01); *B32B 27/08* (2013.01); *B32B 27/12* (2013.01); *B32B 27/18* (2013.01); *B32B 27/20* (2013.01); *B32B 27/26* (2013.01); *B32B 27/281* (2013.01); *B32B 27/34* (2013.01); *B32B 27/36* (2013.01); *B32B 27/40* (2013.01); *B32B 27/42* (2013.01); *B32B 37/14* (2013.01); *C09J 5/06* (2013.01); *B29C 65/14* (2013.01); *B29C 66/81455* (2013.01); *B32B 2250/04* (2013.01); *B32B 2260/023* (2013.01); *B32B 2260/046* (2013.01); *B32B 2262/0253* (2013.01); *B32B 2262/0261* (2013.01); *B32B 2262/0269* (2013.01); *B32B 2262/0276* (2013.01); *B32B 2262/10* (2013.01); *B32B 2262/105* (2013.01); *B32B 2262/106* (2013.01); *B32B 2262/14* (2013.01); *B32B 2264/10* (2013.01); *B32B 2264/102* (2013.01); *B32B 2264/104* (2013.01); *B32B 2270/00* (2013.01); *B32B 2305/076* (2013.01); *B32B 2305/72* (2013.01); *B32B 2305/74* (2013.01); *B32B 2305/77* (2013.01); *B32B 2307/536* (2013.01); *B32B 2307/558* (2013.01); *B32B 2309/02* (2013.01); *B32B 2605/18* (2013.01); *C09J 2463/00* (2013.01)

Secondary Bond

Co-Bond

Co-cure

OFF-SET RESIN FORMULATIONS AND BLOCKING/DEBLOCKING RESIN SYSTEMS FOR USE AS A "CO-CURE-PLY" IN THE FABRICATION OF LARGE-SCALE COMPOSITE STRUCTURE

CROSS-REFERENCE TO RELATED PATENT APPLICATION(S)

This patent application is a continuation-in-part of U.S. patent application Ser. No. 15/274,147 filed Sep. 23, 2016, which claims the benefit of and priority to provisional U.S. Patent Application No. 62/222,365 filed on Sep. 23, 2015 and to provisional U.S. Patent Application No. 62/385,012 filed on Sep. 8, 2016. The contents of the foregoing applications are hereby incorporated by reference in their entireties.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND OF THE INVENTION

The adhesive bonding of composite structures, in particular large or complex structures, is predominantly performed using one of three approaches: 1) secondary bonding; 2) co-bonding; and 3) co-curing. Secondary bonding (shown in FIG. 1A) is the joining together of pre-cured composite parts by adhesive bonding, wherein only the adhesive is being cured. This secondary bonding method typically requires surface preparation of each previously cured composite part at the bonding surfaces to form a strong link. Co-bonding (shown in FIG. 1B) involves joining a pre-cured composite part to an uncured composite part by adhesive bonding, wherein the adhesive and the uncured composite part are being cured during the bonding process. The pre-cured composite usually requires an additional surface preparation step prior to adhesive bonding. The last approach, co-curing (shown in FIG. 1C) joins uncured composite parts by simultaneously curing and bonding, wherein the composite parts are being cured together with the adhesive, resulting in chemical bonding. However, it is difficult to apply this technique to the bonding of uncured prepregs to fabricate large structural parts with complex shapes. Uncured composite materials, e.g. prepregs, are tacky (i.e. sticky to the touch) and lack the rigidity necessary to be self-supporting. As such, uncured composite materials in the co-cure method are frequently difficult to handle. For example, it is difficult to assemble and bond uncured composite materials on tools with complex three-dimensional shapes.

In the aerospace industry, airframe manufacturers making large-scale composite structures commonly apply secondary bonding techniques to join the molded and cured thermoset components. Secondary bonding, while highly effective in most cases, sometimes results in a weak bond at the adhesive/adherent interface. Due to the unpredictable nature of the interface, the Federal Aviation Administration (FAA) certification of primary structures with secondary bonds requires that aircraft manufacturers incorporate redundant load paths accomplished mostly by adding mechanical fasteners. Airframe manufacturers using the secondary bonding approach must additionally install mechanical fasteners on adhesively bonded joints to comply with federal aviation regulations. An average commercial aircraft may contain up to several miles of adhesively bonded joints and thousands of redundant fasteners. An alternate means of assembling large-scale composite structures to meet federal regulations is needed to realize the ultimate potential of composites to reduce cost and increase aircraft performance. In some applications, by removing redundant fasteners in an aircraft, one may reduce the part count by up to 120,000 parts and the weight of the aircraft by up to 5000 lbs. (2%).

The use of secondary bonding and co-bonding techniques frequently result in unpredictable joint strengths that require the addition of mechanical fasteners while the use of the co-cure process is limited by the complexity of the part or the size of the autoclave or oven being used to mold and cure the part. A need exists for alternative manufacturing methods to fabricate unitized composite structures with reliable, certifiable joints without the need for redundant mechanical fasteners.

BRIEF SUMMARY OF THE INVENTION

The present invention is a method for bonding composite substrates including: providing a first composite substrate and a second composite substrate wherein both the first and second composite substrates include one or more reinforcement fibers and a first curable resin, coupling a first co-cure prepreg layer having a first off-set amine to epoxide molar ratio onto a surface of the first composite substrate, and coupling a second co-cure prepreg layer having a second off-set amine to epoxide molar ratio onto a surface of the second composite substrate. The method further includes curing both the first and second composite substrates to the first and second co-cure prepreg layers, respectively, at a first curing cycle to form a first and a second co-cure prepreg layer portion wherein the first and second composite substrates are fully cured and the first and second co-cure prepreg layer portions are partially cured, coupling the first co-cure prepreg layer portion of the first composite substrate to the second co-cure prepreg layer portion of the second composite substrate, and applying a second curing cycle to cure the first co-cure prepreg layer portion of the first composite substrate to the second co-cure prepreg layer portion of the second composite substrate to form a monolithic covalently bonded composite structure.

In another embodiment, the present invention provides a method for bonding composite substrates including: providing a first co-cure prepreg layer portion cured to a surface of a first composite substrate wherein the first co-cure prepreg layer portion includes a first off-set amine to epoxide molar ratio less than about 0.3, providing a second co-cure prepreg layer portion cured to a surface of a second composite substrate wherein the second co-cure prepreg layer portion includes a second off-set amine to epoxide molar ratio greater than about 3.3, coupling the first co-cure prepreg layer portion cured to the first composite substrate to the second co-cure prepreg layer portion cured to the second composite substrate, applying a reflow temperature to the coupled first and second co-cure prepreg layer portions, and applying a second temperature to couple the first co-cure prepreg layer portion of the first composite substrate to the second co-cure prepreg layer portion of the second composite substrate to form a monolithic covalently bonded composite structure.

In yet another embodiment, the invention is a co-curable composite structure including: a first uncured or partially cured composite substrate including one or more reinforcement fibers and a first curable resin wherein the first curable resin includes an epoxide and an amine and a first co-cure prepreg layer coupled to a surface of the first uncured or partially cured composite substrate wherein the first co-cure prepreg layer includes an off-set amine to epoxide ratio of less than about 0.3 or greater than about 3.3. The first uncured or partially cured composite substrate and the first co-cure prepreg layer are cured together at a first curing cycle until the first uncured or partially cured composite substrate and the first co-cure prepreg layer are cured to form the co-curable composite structure.

These and other features, advantages, and objects of the present invention will be further understood and appreciated by those skilled in the art by reference to the following specification, claims, and appended drawings.

DETAILED DESCRIPTION OF THE INVENTION

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

There are typically three standard methods of assembling composite structures: secondary bonding, co-bonding, and co-curing. These currently used methods result in structures that are either restricted by size and complexity or subject to performance-hampering safety modifications. This disclosure introduces and advances modified co-cure methods for the assembly of large-scale composite structures in compliance with safety regulations without the need or requirement of redundant mechanical fasteners. Multifunctional epoxy resins are disclosed herein that produce fully-cured subcomponents with uncured joining surfaces, enabling these uncured joining surfaces to be assembled by co-curing in a subsequent out-of-autoclave process. Although many different functional groups could be selected and used for the methods disclosed herein, aromatic diamines and amines were chosen and used for the two co-cure ply approaches disclosed herein.

Figure 7:
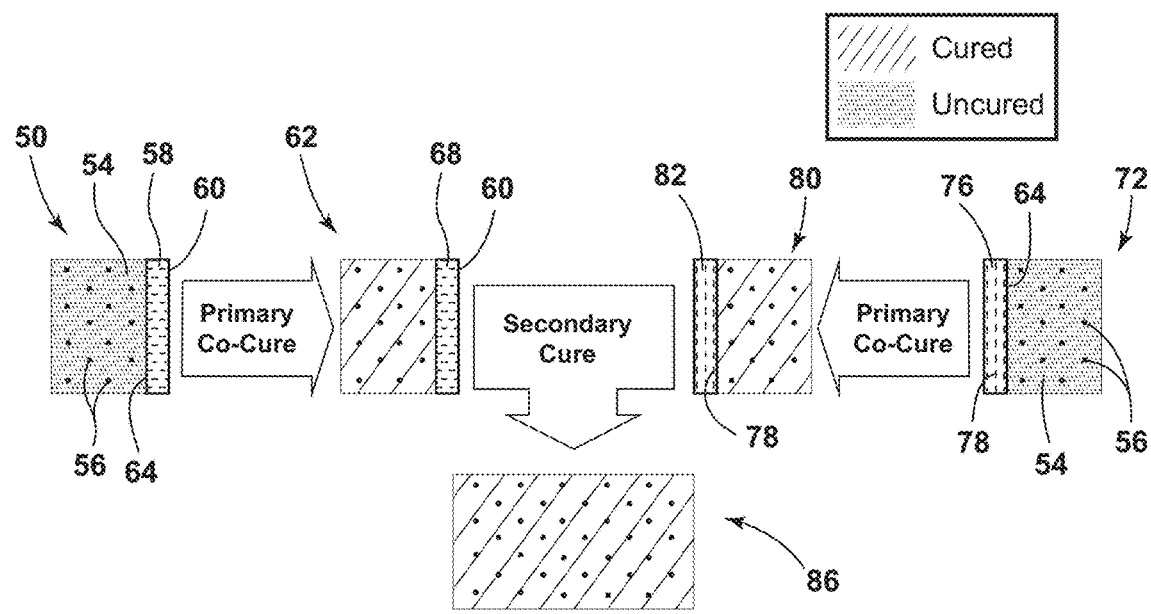
FIG. 7 is a schematic co-cure bonding scheme for assembly of components to form a monolithic covalently bonded composite structure.

The co-cure prepreg layers disclosed herein combine the benefits of secondary bonding and co-curing by creating at least two processes that produce certifiable structures without redundant load paths that are not limited by the complexity of the structure or the size of the autoclave/oven used for curing. Two methodologies have been developed to create a co-cure-ply system: 1) deactivation of the chemistry or functional groups of the hardener; and 2) creation of latency in the co-cure surfaces by altering the stoichiometry of the hardener and epoxy in the respective layers. In both cases, the modified resin systems cannot fully cure without activation of the latent hardener or assembly of complimentary, offset resin systems. FIGS. 2B and 7 generalize both systems with two fully cured composite panels each having an uncured or partially cured surface ply or layer. The limited polymerization in the surface ply(s) or layer is due either to the stoichiometric offset in the hardener/epoxy resin or protected resin. Both approaches prevent vitrification at the surfaces while the rest of the structure is cured. For the protected resin system, the hardener is reactivated using a chemical or physical process before assembly and completing the cure at the interface. For the off-set stoichiometry approach, compaction and/or consolidation processes at intermediate (below cure temperature) temperatures allow for the complimentary, offset resins to intermix by convection and/or diffusion, which enables complete cure and vitrification.

Both the off-set and protected hardener resin systems can interdiffuse with the resin of the epoxy based prepreg laminate and composite substrates, which creates a gradient interface between the co-cure-ply and cured laminate structure. The gradient interface is similar to a joint produced by co-curing, but allows final assembly to take place in a secondary process. The gel point, the degree of cure at which the molecular weight becomes infinite, is related to the physical properties of the epoxy/hardener system during the cure cycle (i.e. viscosity, and complex modulus). The molecular weight of the pre-cured polymer resin and its monomer offset and degree of cure can all be used to control the pre-cured polymer resin rheology. The Protection Deprotection Chemistry and the Off-set Stoichiometry approaches will now be discussed in more detail to explain the composition and method of making these monolithic covalently bonded composite structures.

Protection Deprotection Chemistry

Primary amines are known in the art to be common hardeners for epoxies used in thermoset composites. Using protection chemistry, primary amines can undergo a reversible reaction to form imines. Imine protected hardeners laminated onto a joining surface of a composite substrate will inhibit crosslinking while the remainder of the unprotected amines will fully cure. The uncured surface made up of the protected imines can then be activated through hydrolytic deprotection through the addition of water. This deprotected uncured surface can then be co-cured or joined to another uncured, activated surface resulting in a seamless joint on the final composite structure. Assemblies made by co-curing, until now limited in size and manufacturing complexity, result in predictable structures that are certifiable for commercial aviation without redundant mechanical fasteners reducing the part count by up to about 120,000 parts and the weight by up to about 5000 lbs. (about 2%) in a largely-composite, commercial transport aircraft.

The term, "co-curing," as used herein, is defined as joining uncured composite parts by simultaneously curing, wherein the composite parts are being cured together, through covalent chemical bonding without an adhesive.

Figure 1A:
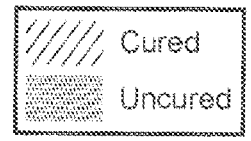
FIG. 1A shows a curing scheme using secondary bonding.
Figure 1A:
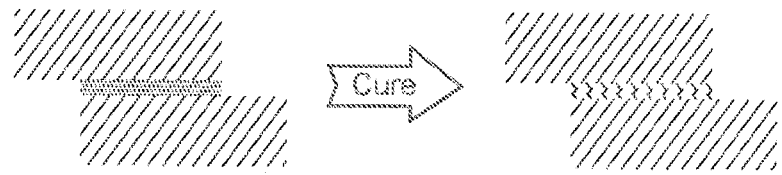
Figure 1B:
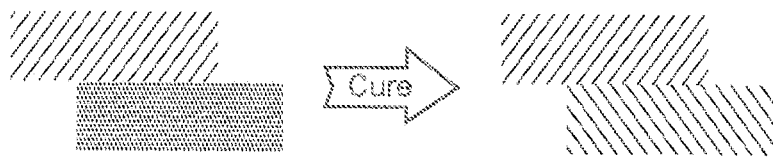
FIG. 1B shows a curing scheme using co-bonding.
Figure 1C:
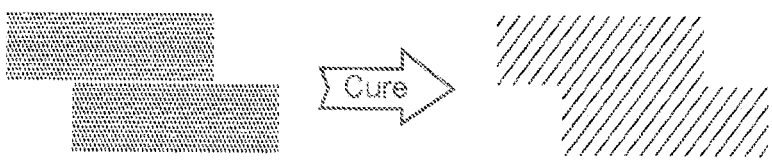
FIG. 1C shows a curing scheme using co-curing.
Figure 2A:
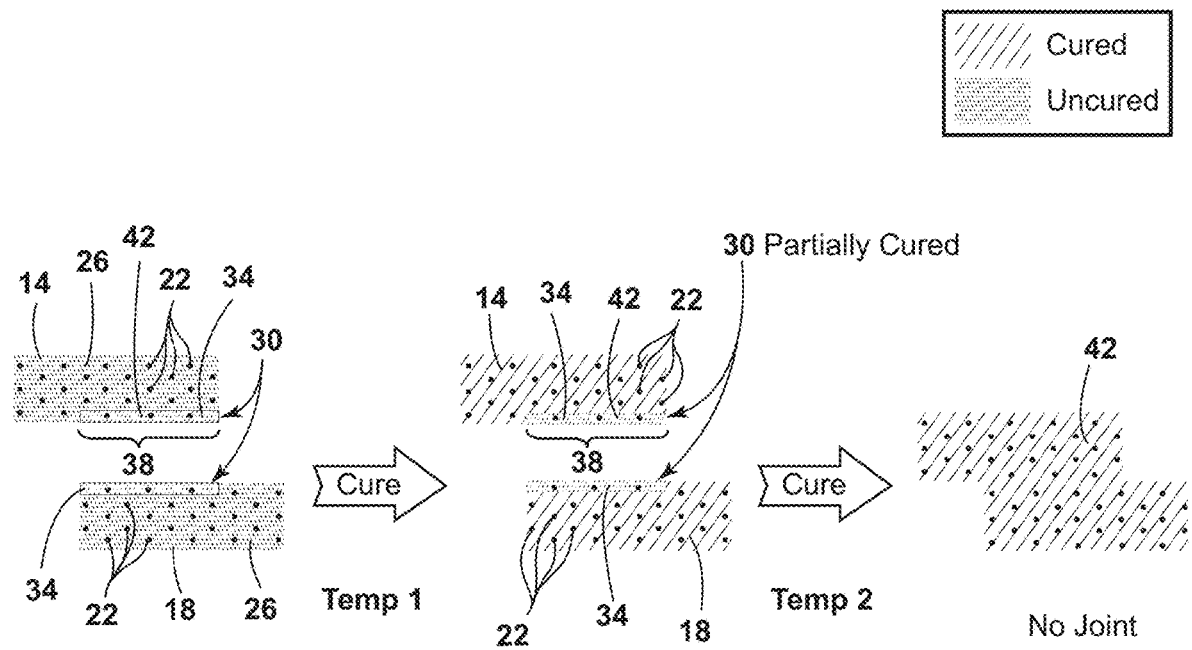
FIG. 2A shows a co-curing scheme using uncured plies.
Figure 2B:
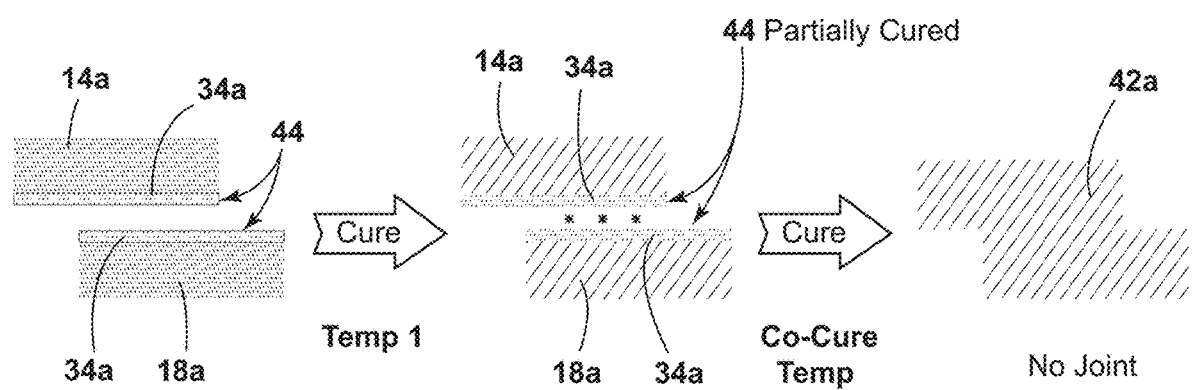
FIG. 2B shows a co-curing scheme using uncured layers.

With reference to FIG. 2A, a first composite substrate 14 and a second composite substrate 18 are uncured or partially cured and may have one or more reinforcement fibers 22 placed in a first curable resin 26 of the first and second composite substrates 14, 18. A co-cure prepreg tape 30 may be coupled to a faying surface 34 on one or both of the first and second composite substrates 14, 18 to form a prepreg tape portion 38. The co-cure prepreg tape 30 is made from a second curable resin 42 having one or more chemically protected functional groups as part of the resin composition. After the co-cure prepreg tape 30 is coupled to the faying surface 34 of one or both of the first and second composite substrates 14, 18, a first temperature is applied to fully cure the first and second composite substrates 14, 18 and partially cure the co-cure prepreg tape 30. A second temperature is then applied to both: deprotect the chemically protected functional groups of the second curable resin 42 to yield polymerizable functional groups in the second curable resin 42; and simultaneously cure the prepreg tape portions 38 of the first and second composite substrates 14, 18 to form a single covalently bonded composite structure 46.

Referring now to FIG. 2B, a first composite substrate 14a and a second composite substrate 18b are uncured or partially cured and may have one or more reinforcement fibers 22 (not shown) placed in a first curable resin 26a of the first and second composite substrates 14a, 18a. A co-cure prepreg layer 44 may be coupled to a surface 34a on one or both of the first and second composite substrates 14a, 18a to form the co-cure prepreg layer 44. The co-cure prepreg layer 44 is made from a second curable resin 42a having one or more chemically protected functional groups as part of the resin composition. After the co-cure prepreg layer 44 is coupled to the surface 34a of one or both of the first and second composite substrates 14a, 18a, a first temperature is applied to fully cure the first and second composite substrates 14a, 18a and partially cure the co-cure prepreg layer 44. A second temperature is then applied to both: deprotect the chemically protected functional groups of the second curable resin 42a to yield polymerizable functional groups in the second curable resin 42a; and simultaneously cure the prepreg layer 44 of the first and second composite substrates 14a, 18a to form a single covalently bonded composite structure 46a.

The disclosure herein enables the fabrication of co-cured structures without the need for a complex mold, autoclave or oven large enough to contain the full-scale composite structures such as the components of a commercial aircraft. Instead, sub-components can be prepared in smaller, simpler molds and autoclaves where the co-cure prepreg tape 30 and/or co-cure prepreg layer 44 may be applied to the faying surfaces 34, 34a. A continuous, joint-free, assembled composite structure can be prepared using a subsequent curing process in a heated device to produce co-cured structures designed to meet Federal Aviation Administration (FAA) certification criteria for composite structures because no adhesive bond or mechanical fasteners are needed. This disclosed co-cure method offers a variety of advantages new to the field of adhesive bonding: 1) preparing a functional group protected resin with complete or nearly quantitative protection to prevent curing at the first temperature; 2) applying two or more composite substrates to each other at a reflow temperature to form a substructure with no breaks or discontinuities; 3) quantitatively removing the protection groups from the functional groups of the resin without damaging the resin or fabricated part; and 4) curing the joint of two or more composite substrates outside of an autoclave.

The present invention is a method for bonding composite substrates including: providing a first composite substrate 14 and a second composite substrate 18 wherein both the first composite substrate 14 and the second composite substrate 18 are uncured or partially cured and include one or more reinforcement fibers 22 and a first curable resin 26; coupling a co-cure prepreg tape 30 onto a faying surface 34 of both the first and second composite substrates 14, 18 wherein the co-cure prepreg tape 30 has a second curable resin 42 having one or more chemically protected polymerizable functional groups; curing the first and second composite substrates 14, 18 to the co-cure prepreg tape 30 at a first temperature to form a co-cure prepreg tape portion 38 wherein the first and second composite substrates 14, 18 are fully cured and the co-cure prepreg tape 30 is partially cured; coupling the co-cure prepreg tape portion 38 of the first composite substrate 14 to the co-cure prepreg tape portion 38 of the second composite substrate 18; applying a second temperature to facilitate deprotection with water and a hydrolysis catalyst of the chemically protected polymerizable functional groups to give unprotected polymerizable functional groups and cure the co-cure prepreg tape portion 38 of the first composite substrate 14 to the co-cure prepreg tape portion 38 of the second composite substrate 18 to form a single covalently bonded composite structure 46.

The terms "cure" and "curing" as used herein encompass polymerizing and/or crosslinking of a resin or polymeric material brought about by mixing of reactive based components with a functionality of two or more, heating at elevated temperatures, and/or exposing the materials to ultraviolet light and radiation. The term "fully cured," as used herein, ideally refers to a 100% degree of cure. As known in the art, even when using the term "fully cured" there may still regularly be some residual functional groups that have not polymerized or cross-linked due to chain end mobility or other known reasons. In some embodiments, a "fully cured" resin or composition may contain less than about 1%, less than about 0.1%, or less than about 0.01% residual reactive functional groups as determined by the molar percentage of the initial total moles of functional groups in a material. "Partially cured" as used herein refers to less than 100% degree of cure. In some embodiments, a "partially cured" resin may contain more than about 10%, more than about 20%, more than about 30%, more than about 40%, more than about 50%, more than about 60%, more than about 70%, more than about 80%, or more than about 90% residual reactive functional groups as determined by the molar percentage of the initial total moles of functional groups in the material.

The number and types of composite substrates used in the disclosed co-cure process to make the final composite structures can vary depending on the application and intended use of the final composite material. For example, in some embodiments, two composite substrates may be co-cured together but in other embodiments three or more different composite substrates may be used to fabricate or co-cure the final composite structure. The composite substrates used in the co-cure process are all initially uncured or partially cured so that these materials have the capability to be cured, co-cured, and covalently bonded to other composites or co-cure prepreg materials such as the co-cure prepreg tape 30 or co-cure prepreg layer 44.

Examples of suitable thermoset resins that may be used for the first curable resin 26 and the second curable resin 42 that make up the first and the second composite substrates 14, 18, respectively, and the co-cure prepreg tape and layer 30, 44 include, but are not limited to, epoxies, phenolics, cyanate esters, polyimides, bismaleimides, polyesters, polyurethane, benzoxazines (including polybenzoxazines), amines, alcohols, and combinations thereof.

In some embodiments, a multifunctional epoxy resin (or polyepoxide) having a plurality of epoxide functional groups per molecule may be used for the first curable resin 26 and the second curable resin 42. The polyepoxide may be saturated, unsaturated, cyclic, or acyclic, aliphatic, aromatic, or hetero-cyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)-methane), fluorine 4,4'-dihydroxy benzophenone, bisphenol Z (4,4'-cyclohexy-lidene-bisphenol) and 1,5-hyroxynaphthalene.

Examples of suitable epoxy resins used for the first and second curable resins 26, 42 include diglycidyl ethers of bisphenol A or bisphenol F, e.g. EPON™ 828 (liquid epoxy resin), DER 331, DER 661 (solid epoxy resins) available from Dow Chemical Co.; triglycidyl ethers of aminophenol, e.g. AR ALDITE® MY 0510, MY 0500, MY 0600, MY 0610 from Huntsman Corp. Additional examples include phenol-based novolac epoxy resins, commercially available as DEN 428, DEN 431, DEN 438, DEN 439, and DEN 485 from Dow Chemical Co.; cresol-based novolac epoxy resins commercially available as ECN 1235, ECN 1273, and ECN 1299 from Ciba-Geigy Corp.; hydrocarbon novolac epoxy resins commercially available as TACTIX® 71756, TACTIX®556, and TACTIX®756 from Huntsman Corp. In some embodiments, the epoxy resin may be DER 331 which is the reaction product of epichlorohydrin and bisphenol A. The tradename DER 331 is also commonly known as bisphenol A diglycidyl ether or 2,2'-(((propane-2,2-diylbis (4,1-phenylene))bis(oxy))bis(methylene))bis(oxirane).

The first and second composite substrates 14, 18 may contain one or more reinforcement fibers or a layer of fibrous material. These fiber reinforced composites, including prepregs or prepreg layups, are ideal materials to be used for making aerospace composite structures. The term "prepreg," as defined herein, refers to a layer of fibrous material (e.g. fibers, unidirectional fibers, unidirectional tows or tape, non-woven mat, and/or fabric ply) that has been impregnated with a curable matrix resin or curable resin as previously described above. The first curable resin 26 in the composite substrates may be in an uncured or partially cured state. Prepregs may be manufactured by infusing or impregnating continuous fibers or woven fabric with a matrix resin system, creating a pliable and tacky sheet of material. This is often referred to as a prepregging process. The precise specification of the fibers, their orientation and the formulation of the resin matrix can be specified to achieve the optimum performance for the intended use of the prepregs. The volume of fibers per square meter can also be specified according to requirements. The fiber reinforcement material may be in the form of a woven or nonwoven fabric ply, or continuous unidirectional fibers. The term "unidirectional fibers", as used herein, refers to a layer of reinforcement fibers that are aligned in the same direction.

The reinforcement fibers in the composite substrates (e.g. prepregs) may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. Woven fiber structures may comprise a plurality of woven tows, each tow composed of a plurality of filaments, e.g. thousands of filaments.

In some embodiments, the one or more reinforcement fibers may include, but are not limited to, glass (including Electrical or E-glass), carbon (including graphite), aramid, polyamide, high-modulus polyethylene (PE), polyester, poly-p-phenylene-benzoxazole (PBO), boron, quartz, basalt, ceramic, and combinations thereof.

The co-cure prepreg tape 30 contains the second curable resin 42 that may be a mixture of the multifunctional epoxy resin (previously described above) having a protected functional group that can react with the epoxy group once deprotected. Besides the portion of unprotected functional groups in the first and second composite substrates 14, 18 that may intermix or diffuse into the co-cure prepreg tape 30 during a reflow step described below that can be used to co-cure or cure the first and second composite substrates 14, 18 to the co-cure prepreg tape 30, respectively, the majority of functional groups that could react with the multifunctional epoxy resin are protected in the co-cure prepreg tape 30. The protected polymerizable functional groups leave the co-cure prepreg tape 30 uncured and ready for assembly and additional co-cure steps in an out-of-autoclave process.

The assembly process requires water to reverse the inhibiting or protection effects of the imines in the co-cure tape 30 before joining the co-cure prepreg portions 38 together. Crosslinking results in a solid part with seamless, continuous structure through the joint, much like the co-curing result. But like the secondary bonding process, an autoclave is not necessary and more complex structures can be bonded. In some embodiments, as an alternative to using an autoclave for heating the substructures or first and second composite substrates 14, 18, other non-limiting options for heating can be a vacuum bag and oven, a mechanical clamping approach and an oven, a heat blanket, or other radiating heat sources.

When compared to secondary bonding and co-bonding, the co-cure method reduces the number of exposures to heat in an autoclave to complete the final composite structure. Also, because this method does not rely on an autoclave to join parts to make the entire structure, rather only pieces of it, the creation of large-scale composite structures is possible. The seamless joint between two parts of the composite structure eliminates the need for redundant mechanical fasteners.

The reactivity of the co-cure prepreg tape can be inhibited and activated in a controllable manner. Protection chemistry of the reactive functional groups can be used to prevent the polymerization and crosslinking within the resin. In some embodiments, crosslinking and polymerization occurs when an epoxy is combined with a hardener or co-monomer and the materials are heated and/or pressed causing the resin mixture to cure. The hardener component contains functional groups that readily react with the epoxy functionality of the epoxy resin to produce highly cross-linked networks resulting in a fully cured composite structure. One common functional group used as a hardener is primary amines. Primary amines are functional groups with a $H_2N$—. By using ketone or aldehyde protection chemistry, an amine's functionality can be blocked through the formation of imines. The reaction schemes below show the reversible protection of primary amines using aldehydes or ketones.

droisophorone, cyclopentanone, cyclopentenone, cyclohexanone, cyclohexenone, acetophenone, ethyl phenyl ketone, benzophenone, and combinations thereof.

Aldehydes suitable for use as described herein include but are not limited to 4-methylbenzaldehyde (para-tolualdehyde), 3-methylbenzaldehyde (meta-tolualdehyde), 2-methylbenzaldehyde (ortho-tolualdehyde), benzaldehyde, isobutyraldehyde, and combinations thereof.

When the co-cure prepreg tape 30 is coupled to the first and second composite substrates 14, 18, both the co-cure prepreg tape 30 and the respective composite structure may be heated at a reflow temperature that may be lower than the first temperature. As the reflow temperature is applied to the co-cure prepreg tape 30 coupled to the first and second composite substrates 14, 18, the first and second curable resins 26, 42 may begin to reflow with the composite substrates. In these embodiments, the term "reflow," as used herein, means deprotected functional groups in the first curable resin 26 of the first and second composite substrates 14, 18, such as amine groups, may intermix and/or interdiffuse into the second curable resin 42 of the co-cure prepreg tape portion 38. In addition, as part of the reflow, the protected functional groups in the second curable resin 42 of the co-cure prepreg tape portion 38, such as imine groups, may intermix and/or interdiffuse into the first curable resin 26 of the first and second composite substrates 14, 18

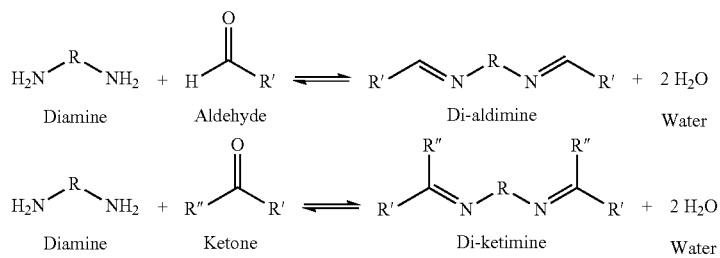

Aldimines are imines that are formed after a primary amine is reacted with an aldehyde. Ketimines are imines that formed after a primary amine has been reacted with a ketone. The amine functional group is protected by condensation with a ketone or aldehyde to form an imine. In both of these reaction schemes, the removal of water is directly proportional to the amount of imine that is produced. The imine is not reactive with epoxies when added as a hardener. Because this reaction is reversible, water can react with the imine to reproduce the amine and its associated aldehyde or ketone. A variety of effective catalysts may be used to facilitate the hydrolysis of the imine such as, for example, acidic alumina and imidazole.

Amines suitable for use as described herein include but are not limited to 4,6-diethyl-2-methylbenzene-1,3-diamine (ethacure 100), benzene-1,2-diamine (ortho-phenylenediamine), benzene-1,3-diamine (meta-phenylenediamine), benzene-1,4-diamine (para-phenylenediamine), benzidine, 2,5-diaminotoluene, and combinations thereof.

Ketones suitable for use as described herein include but are not limited to methyl isobutyl ketone (MIBK), acetone, methyl ethyl ketone, methyl n-propyl ketone, methyl isopropyl ketone, methyl n-butyl ketone, methyl amyl ketone, diethyl ketone, ethyl propyl ketone, ethyl butyl ketone, ethyl amyl ketone, dipropyl ketone, propyl butyl ketone, dibutyl ketone, butyl amyl ketone, allyl butyl ketone, diamyl ketone, 2,4-hexanedione, methyl vinyl ketone, isophorone, dihyrespectively. The mixing, migration, and/or diffusion, of protected and unprotected functional groups within the first and second curable resins 26, 42 allows the first and second composite structures 14, 18 to be co-cured or covalently bonded to the co-cure prepreg tape portion 38 to form a single covalently bonded composite substrate. Although a portion of the deprotected functional groups intermix into the co-cure prepreg tape portion 38 with the functional protected groups and the protected functional groups intermix into the composite structures 14, 18 with the deprotected functional groups, a majority of both the protected and deprotected functional groups remain located in their respective co-cure prepreg tape portion 38 or composite substrate 14, 18 areas. The reflow temperature may be from about 25° C. to about 150° C., from about 25° C. to about 125° C., from about 25° C. to about 100° C., from about 50° C. to about 100° C., from about 50° C. to about 75° C., or from about 75° C. to about 100° C.

After the reflow temperature is applied to intermix the protected and unprotected functional groups of the first and second curable resins 26, 42, the first temperature may be applied to co-cure the co-cure prepreg tape 30 to the first and second composite substrates 14, 18 respectively, until the first and second composite substrates 14, 18 are fully cured and the co-cure prepreg tape 38 is partially cured due to the protected polymerizable functional groups remaining in the co-cure prepreg tape 38. The first temperature may be from about 50° C. to about 400° C., from about 50° C. to about 375° C., from about 50° C. to about 250° C., from about 75° C. to about 350° C., from about 75° C. to about 250° C., from about 100° C. to about 250° C., from about 125° C. to about 350° C., or be set at about 50° C., about 75° C., about 100° C., about 125° C., about 150° C., about 175° C., about 200° C., about 225° C., about 250° C., about 275° C., about 300° C., about 325° C., about 350° C., or about 375° C.

Once the first and second composite substrates 14, 18 are fully cured and the co-cure prepreg tape 30 is partially cured, the partially cured co-cure prepreg tape portion 38 of the first composite substrate 14 may be coupled to the partially cured co-cure prepreg tape portion 38 of the second composite substrate 18. Coupling the two partially cured co-cure prepreg tape portions 38 puts the deprotected functional groups of both composite substrates into direct physical contact with each other for both the deprotecting and final co-cure steps.

Applying the second temperature with water facilitates deprotection of the chemically protected polymerizable functional groups (e.g. imines) to give polymerizable functional groups (e.g. amines). In addition, applying the second temperature facilitates the co-curing of the co-cure prepreg tape portions 38 of the first composite material 14 and the co-cure prepreg tape portions 38 of the second composite material 18 to form a single covalently bonded composite structure 46. The second temperature may be the same or different from the first temperature and can range from about 50° C. to about 400° C., from about 50° C. to about 375° C., from about 50° C. to about 250° C., from about 75° C. to about 350° C., from about 75° C. to about 250° C., from about 100° C. to about 250° C., from about 125° C. to about 350° C., or be set at about 50° C., about 75° C., about 100° C., about 125° C., about 150° C., about 175° C., about 200° C., about 225° C., about 250° C., about 275° C., about 300° C., about 325° C., about 350° C., or about 375° C.

As described herein, in some embodiments the protected polymerizable functional group is the aldimine or ketamine. As the second temperature is applied and the aldimine or ketamine is deprotected to give the reactive amine, the introduction of water may be required so that the hydrolysis or deprotection reaction can take place. Water may be added to the partially cured co-cure prepreg tape portions 38 of the first and second composite substrates 14, 18 by coupling a layer of water to the faying surface of co-cure prepreg tape portions 38 when coupling the composite substrates into direct physical contact with each other before the deprotecting and final co-cure steps. In addition to the water being added to enable the hydrolysis of the aldimine or ketamine to the amine, a hydrolysis catalyst may be added to facilitate the hydrolysis. In some embodiments, hydrolysis catalysts suitable for use include but are not limited to acidic alumina, imidazole, and combinations thereof.

In other embodiments, the first and second curable thermoset resin 26, 42 of the first and second composite substrates 14, 18 and co-cure prepreg tape 30 may all contain one or more additives, accelerators, or catalysts that function to modify the rate of the polymerization and/or crosslinking reaction in the corresponding thermoset resins.

In some embodiments, curing agents (or curatives) are preferentially selected to allow for a slower cure rate than that of the composite substrate's matrix resin. The curatives may be selected from well-known curatives with reactivities that are well established. For instance, curatives for epoxy resins in order of increasing curing rate are generally classified as: polymercaptan<polyamide<aliphatic polyamine<aromatic polyamine derivatives<tertiary amine boron trifluoride complex<acid anhydride<imidazole<aromatic polyamine<cyanoguanadine<phenol novolac. This list is only a guide and overlap within classifications exists. Curatives of the surface treatment layer are generally selected from groups that are listed towards the higher end of the reaction order, whereas the composite substrate's curatives may be generally selected from groups towards the beginning of the reaction order.

Some non-limiting examples of curatives that may be used include, but are not limited to, melamine and substituted melamine derivatives, aliphatic and aromatic primary amines, aliphatic and aromatic tertiary amines, boron trifluoride complexes, guanidines, dicyandiamide, bisureas (including 2,4-toluene bis-(dimethyl urea), commercially available as CA 150 from CVC Thermoset Specialties), 4,4'-Methylene bis-(phenyl dimethylurea), e.g. CA 152 from CVC Thermo-set Specialties), 4,4'-diaminodiphenylsulfone (4,4-DDS), and combinations thereof.

Cure inhibitors are molecules able to slow the rate of reaction between the thermoset resins and curatives. Thus, the thermoset resins and curatives used in the composite substrate and co-cure prepreg tape will cure at a slower rate due to the presence of the inhibitors.

In some embodiments, examples of suitable cure inhibitors include, but are not limited to, boric acid, trifluoroborane, and derivatives thereof such as alkyl borate, alkyl borane, trimethoxyboroxine and organic acids having a pKa from 1 to 3 such as maleic acid, salicyclic acid, oxalic acid and mixtures thereof. Other inhibitors include metal oxides, metal hydroxides, and alkoxides of metal, where the metal is zinc, tin, titanium, cobalt, manganese, iron, silicon, boron, or aluminum. When such inhibitor is used, the amount of inhibitor may be up to about 15 parts per hundred parts of resin or PHR, for example, about 1 to about 5 PHR, in a resin composition. "PHR" is based on the total weight of all resins in the resin composition.

Catalysts facilitate the polymerization and crosslinking reactions of the thermoset resins when epoxy resins are used. Some examples of suitable catalysts for epoxy polymerization and crosslinking are compounds containing amine, phosphine, heterocyclic nitrogen, ammonium, phosphonium, arsenium, or sulfonium moieties. In other embodiments, heterocyclic nitrogen-containing and amine-containing compounds may be used such as, for example, imidazoles, imidazolidines, imidazolines, benzimidazoles, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, and combinations thereof. When such catalysts are used, the amount of catalyst(s) may be up to 15 parts per hundred parts of resin or PHR, for example, about 1 to about 5 PHR, in a resin composition.

Inorganic fillers in particulate form (e.g. powder) may also be added to the curable thermoset resins of the first and second composite substrates 14, 18 as a rheology modifying component to control the flow of the resin composition and to prevent agglomeration therein. In some embodiments, suitable inorganic fillers may include, but are not limited to, fumed silica, talc, mica, calcium carbonate, alumina, ground or precipitated chalks, quartz powder, zinc oxide, calcium oxide, and titanium dioxide. If present, the amount of fillers in the resin composition may be from about 0.5% to about 40% by weight, or from about 1% to about 10% by weight, or from about 1% to about 5% by weight, based on the total weight of the resin composition.

In a second embodiment, shown in FIG. 2B, the present invention provides a method for bonding composite substrates including: providing a co-cure prepreg layer 44 cured to a surface 34a of both a first composite substrate 14a and a second composite substrate 18a wherein the co-cure prepreg layer 44 includes a chemically protected polymerizable functional group; coupling a portion of the co-cure prepreg layer 44 cured to the first composite substrate 14a to a portion of the co-cure prepreg layer 44 cured to the second composite substrate 18a; applying a deprotection initiator to deprotect the protected polymerizable functional group of the co-cure prepreg layers 44 and to couple the co-cure prepreg layers 44 of the first and second composite substrates 14a, 18a, to form a single covalently bonded composite structure 46a.

It is understood that the descriptions outlining and teaching the method for bonding composite structures previously discussed, which can be used in any combination, apply equally well to the second embodiment of the invention, where applicable, further disclosing a method for bonding composite substrates.

As an alternative to the co-cure prepreg tape 30 described above that only couples to a portion of the first and second composite substrates 14, 18, here, the co-cure prepreg layer 44 may be coupled to the entire surface of the first and second composite substrates 14, 18, The co-cure prepreg layer 44 contains the second curable resin 42 that may be a mixture of the multifunctional epoxy resin (previously described above) having a protected functional group that can react with the epoxy group once deprotected. Besides the portion of unprotected functional groups in the first and second composite substrates 14, 18 that may intermix or diffuse into the co-cure prepreg tape 30 during the reflow step described above that can be used to co-cure or cure the first and second composite substrates 14, 18 to the co-cure prepreg layer 44, respectively. The majority of functional groups that could react with the multifunctional epoxy resin are protected in the co-cure prepreg layer 44 so these protected polymerizable functional groups leave the co-cure prepreg layer 44 uncured and ready for assembly and additional co-cure steps in an out-of-autoclave process.

The advantages of using the co-cure prepreg layer 44 instead of the co-cure prepreg tape 30 can be having more of the second curable resin 42 in contact with the first curable resin 26 of the first and second composite substrates 14, 18 to give more of a co-cured surface area. Depending on the desired use and application of the final covalently bonded composite structure 46a, the use of the co-cure prepreg layer 44 may offer the required bonding and adhesion needed between the composite substrates. The final single covalently bonded composite structure 46a may include a crosslinked amine-cured epoxy polymer network when epoxides and amines are used as the polymerizable or crosslinkable functional groups in the first and second curable resins 26, 42.

Depending on the composition of the second curable resin containing the protected polymerizable functional groups, a variety of different deprotection initiators may be used. As described above, water and a hydrolysis catalyst may be used for a chemical deprotection initiator. In other embodiments, thermal energy or light may be used to as the deprotection initiators for the protected polymerizable functional groups in the second curable resin in the co-cure prepreg tape 30 or co-cure prepreg layer 44. In some embodiments, the application of a mechanical force may be used as the deprotection initiator for the protected polymerizable functional groups in the second curable resin. In still other embodiments, the deprotection initiator comprises a heat source, a chemical reagent, a light source, a mechanical force, or a combination thereof.

In a third embodiment, the invention is a co-curable composite structure including: an uncured or partially cured composite substrate having one or more reinforcement fibers 22 and a first curable resin 26 wherein the first curable resin material 26 includes a first epoxide and an amine; a co-cure prepreg layer 44 on a surface 34 of the uncured or partially cured composite substrate wherein the co-cure prepreg layer 44 includes a second curable resin 42 having a second epoxide and a protected amine; wherein the uncured or partially cured composite substrate and the co-cure prepreg layer 44 are cured together at a first temperature until the uncured or partially cured composite structures and the co-cure prepreg layer 44 are functionally fully cured to form the co-curable composite structure; and wherein the protected amine of the co-cure prepreg layer remains latent until a deprotection and co-cure step.

It is understood that the descriptions outlining and teaching the method for bonding composite structures previously discussed, which can be used in any combination, apply equally well to the third embodiment of the invention, where applicable, further disclosing a co-curing composite structure.

The uncured or partially cured composite substrate and the co-cure prepreg layer 44 are cured together at the first temperature until the uncured or partially cured composite structures and the co-cure prepreg layer 44 are functionally fully cured. During this first temperature, the first epoxide and the amine from the first curable resin material 26 of the uncured or partially cured composite substrate are intermixed or interdiffused with the second epoxide and the protected amine from the second curable resin 42 of the co-cure prepreg layer 44 and vice versa. The intermixing of epoxides and amines, both protected and deprotected, are what facilitate the uncured or partially cured composite substrate and the co-cure prepreg layer 44 to be cured together. In some embodiments, the interdiffusion or intermixing of epoxides and amines, both protected and deprotected, may be performed at a separate reflow temperature before the first temperature is applied. After this initial curing of the uncured or partially cured composite substrate and the co-cure prepreg layer 44, the protected polymerizable functional group or protected amine remain latent in the co-cure prepreg layer 44 until the deprotection initiator may be applied to deprotect the protected amine to form the amine. The amine or other unprotected polymerizable functional group can then react with unreacted first and second epoxides to co-cure the co-curing composite structure to another such structure. Controlling or balancing the stoichiometry of the epoxide functional groups to the amines and protected amines allows for a controlled polymerization or cross linking reactions.

A suppression in the glass transition temperature is observed for the cured prepreg tape portion 38 or co-cure prepreg layer 44 having chemically protected functional groups such as imines with respect to the cure substrates or composites not having chemically protected functional groups. A decrease in the glass transition temperature ($T_g$) of at least about 25° C., about 50° C., about 75° C., about 100° C., about 125° C., about 150° C., or about 175° C. may be obtained for the cured substrates or composites (e.g. the cured prepreg tape portion 38 or the co-cure prepreg layer 44) with chemically protected functional groups relative to the glass transition temperature of the same cured substrates or composites using unprotected functional groups.

Off-Set Stoichiometry

Using an off-set monomer ratio in a co-cure prepreg layer can limit the extent of polymerization in the polymer resin of a composite substrate, particularly on the joining surfaces, as the composite substrates are cured. These joining surfaces of partially cured resin can then be assembled and co-cured in a secondary cure process. The partially cured resins of the respective co-cure prepreg areas can re-flow and/or diffuse across the assembled interface allowing mixing of the resin between the joining surfaces placed in contact. Once sufficient mixing and inter-diffusion has occurred, the co-cure prepreg layers are heated to the cure or hardening temperature to polymerize and crosslink the respective co-cure prepreg layers at the interface. The entire monolithic covalently bonded composite structure appears co-cured although the manufacturing process is greatly simplified by allowing the fabrication and assembly of smaller/simpler composite structures in a primary process step and assembly in a secondary process.

Referring now to FIG. 7, a first composite substrate 50 and a second composite substrate 72 are uncured or partially cured and may have one or more reinforcement fibers 56 placed in a first curable resin 54 of the first and second composite substrates 50, 72. A first co-cure prepreg layer 58 may be coupled to a surface 64 on the first composite substrate 50 and a second co-cure prepreg layer 76 may be coupled to the surface 64 on the second composite substrate 72. The first and second co-cure prepreg layers 58, 76 are made from a hardener rich resin 60 and an epoxy rich resin 78, respectively. After the first and second co-cure prepreg layers 58, 76 are coupled to the surfaces 64 of the first and second composite substrates 50, 72, a first curing cycle is applied to fully cure the first and second composite substrates 50, 72 and partially cure the first and second co-cure prepreg layer 58, 76 to form a first and a second co-cure prepreg layer portion 68, 82. The first co-cure prepreg layer portion 68 is then coupled to the second co-cure prepreg layer portion 82 and a reflow temperature is applied to reduce the viscosity of the partially cured hardener rich resin 60 of the first co-cure prepreg layer portion 68 and the epoxy rich resin 78 of the second co-cure prepreg layer portion 82 making the resins 60, 78 flow and diffuse between the two prepreg layer portions 68, 82 to reestablish the desired stoichiometry of the hardener and epoxy functional groups. After the hardener rich resin 60 and the epoxy rich resin 78 sufficiently mix at the reflow temperature, a second curing cycle may be applied to cure the hardener and epoxy chemical functionalities to provide a monolithic covalently bonded composite structure 86.

In some embodiments, the first composite substrate 50 and the second composite substrate 72 are uncured or partially cured and may have one or more reinforcement fibers 56 placed in the first curable resin 54 of the first and second composite substrates 50, 72. The first and second co-cure prepreg layers 58, 76 may be coupled to the respective surface 64 on the first and second composite substrates 50, 72. In these embodiments, both the first and second co-cure prepreg layers 58, 76 are made from the hardener rich resin 60 or the epoxy rich resin 78. After the first and second co-cure prepreg layers 58, 76 are coupled to the surfaces 64 of the first and second composite substrates 50, 72, the first curing cycle is applied to fully cure the first and second composite substrates 50, 72 and partially cure the first and second co-cure prepreg layer 58, 76 to form the first and second co-cure prepreg layer portion 68, 82. The first and second co-cure prepreg layer portions 68, 82 can then both be coupled to a complimentary offset resin layer (not shown) where the offset resin layer could be either the hardener rich resin 60 or the epoxy rich resin 78 based on the resin used for the two prepreg layer portion 68, 82. In these types of embodiments, the offset resin layer is sandwiched between the first and second co-cure prepreg layer portion 68, 82. The reflow temperature can then be applied to reduce the viscosity of the first and second co-cure prepreg layer portions 68, 82 and the offset resin layer so the respective resins can flow and diffuse between the layers to reestablish the desired stoichiometry of the hardener and epoxy functional groups. After the hardener rich resin 60 and the epoxy rich resin 78 sufficiently mix at the reflow temperature, the second curing cycle may be applied to cure the hardener and epoxy chemical functionalities to provide the monolithic covalently bonded composite structure 86.

The off-set stoichiometry disclosure herein enables the fabrication of co-cured structures without the need for a complex mold, autoclave or oven large enough to contain the full-scale composite structures such as the components of a commercial aircraft. Instead, sub-components can be prepared in smaller, simpler molds and autoclaves where the first and second co-cure prepreg layers 58, 76 may be applied to the surfaces 64 of the first and second composite substrates 50, 72. A continuous, joint-free, assembled composite structure can be prepared using a subsequent curing process in a heated device to produce co-cured structures designed to meet Federal Aviation Administration (FAA) certification criteria for composite structures because no secondary adhesive bond is formed. This disclosed co-cure method offers a variety of advantages new to the field of adhesive bonding: 1) preparing resins containing complementary latent functional groups by off-setting their stoichiometry; 2) applying two or more composite substrates to each other at one or more reflow temperatures to form a substructure with no interfaces or discontinuities in the composition; 3) allowing the flow and diffusion of the complementary latent functional groups to reach an equilibrium with each other to reestablish a desired stoichiometry of the functional groups; and 4) curing the joint of two or more composite substrates outside of an autoclave.

The present invention is a method for bonding composite substrates including: providing the first composite substrate 50 and the second composite substrate 72 wherein both the first and second composite substrates 50, 72 include one or more reinforcement fibers 56 and the first curable resin 54, coupling the first co-cure prepreg layer 58 having the first off-set amine to epoxide molar ratio onto the surface 64 of the first composite substrate 50, and coupling the second co-cure prepreg layer 76 having the second off-set amine to epoxide molar ratio onto the surface 64 of the second composite substrate 72. The method further includes curing both the first and second composite substrates 50, 72 to the first and second co-cure prepreg layers 58, 76, respectively, at the first curing cycle to form the first and the second co-cure prepreg layer portions 68, 82 wherein the first and second composite substrates 50, 72 are fully cured to form a cured first and a cured second composite substrate 62, 80 and the first and second co-cure prepreg layer portions 68, 82 are partially cured. The method further includes coupling the first co-cure prepreg layer portion 68 of the first composite substrate 50 to the second co-cure prepreg layer portion 82 of the second composite substrate 72, and applying the second curing cycle to cure the first co-cure prepreg layer portion 68 of the first composite substrate 50 to the second co-cure prepreg layer portion 82 of the second composite substrate 72 to form the monolithic covalently-bonded composite structure 86.

The term, "composite substrates," as used herein, is meant to include substrates that are at least partially uncured and may include prepreg laminates. The number and types of composite substrates used in the disclosed co-cure process to make the final composite structures can vary depending on the application and intended use of the final composite material. For example, in some embodiments, two composite substrates may be co-cured together but in other embodiments three or more different composite substrates may be used to fabricate or co-cure the final composite structure. The composite substrates used in the co-cure process are all initially uncured or partially cured so that these materials have the capability to be cured, co-cured, consolidated, and covalently bonded to other composites or co-cure prepreg materials such as the first and second co-cure prepreg layer 58, 76.

Examples of suitable thermoset resins that may be used for the first curable resin 54, the hardener rich curable resin 60, and the epoxy rich curable resin 78 that make up the first and the second composite substrates 50, 72, respectively, and the first and second co-cure prepreg layers 58, 76 include, but are not limited to, epoxies, phenolics, cyanate esters, polyimides, bismaleimides, polyesters, polyurethane, benzoxazines (including polybenzoxazines), amines, alcohols, and combinations thereof. In some embodiments, the first curable resin 54, the hardener rich curable resin 60, and the epoxy rich curable resin 78 may each include any AA or BB type monomers with a functionality (f) of at least 2 that can be used to carry out any "A, B" type step growth polymerization.

Although the off-set monomers used herein for the respective resins of the first and second co-cure prepreg layers 58, 76 are amines and epoxides, this approach could be applied to additional complementary functionalities such as alcohols, acid halides, carboxylic acids, phosphates, halides, aldehydes, ketones, ethers, esters, amides, cyano groups, isocyanide groups, thiols, sulfonic acids, sulfenic acids, sulfinic acids, phosphines, azo groups, or any ring opening functionalities. The requirement for this off-set monomer approach is that the respective off-set monomers have a functionality of at least 2 (f=2) and corresponding functional or reactive groups that can react with each other to form an extended network with an increased molecular weight.

In some embodiments, a multifunctional epoxy resin (or polyepoxide) having a plurality of epoxide functional groups per molecule may be used for the first curable resin 54, the hardener rich curable resin 60, and the epoxy rich curable resin 78. The polyepoxide may be saturated, unsaturated, cyclic, acyclic, aliphatic, aromatic, or hetero-cyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl)-methane), fluorine 4,4'-dihydroxy benzophenone, bisphenol Z (4,4'-cyclohexylidene-bisphenol) and 1,5-hyroxynaphthalene.

Amines suitable for use as described herein include, but are not limited to 4,6-diethyl-2-methylbenzene-1,3-diamine (ethacure 100), benzene-1,2-diamine (ortho-phenylenediamine), benzene-1,3-diamine (meta-phenylenediamine), benzene-1,4-diamine (para-phenylenediamine), benzidine, 2,5-diaminotoluene, C4 aliphatic diamines, C5 aliphatic diamines, C6 aliphatic diamines, C7 aliphatic diamines, C8 aliphatic diamines, C9 aliphatic diamines, C10 aliphatic diamines, C11 aliphatic diamines, C12 aliphatic diamines, and combinations thereof. Additional classes of amines suitable for use as described herein include aromatic amines, aliphatic amines, triamines, polyamines, and combinations thereof.

The first and second composite substrates 50, 72 may contain one or more reinforcement fibers 56 or a layer of fibrous material. These fiber reinforced composites, including prepregs or prepreg layups, are ideal materials to be used for making aerospace composite structures. The term "prepreg," as defined herein, refers to a layer of fibrous material (e.g. fibers, unidirectional fibers, unidirectional tows or tape, woven mat, non-woven mat, and/or fabric ply) that has been impregnated with a curable matrix resin or curable resin as previously described above. The first curable resin 54 in the composite substrates 50, 72 may be in an uncured or partially cured state. Prepregs may be manufactured by infusing or impregnating continuous fibers or woven fabric with a matrix resin system, creating a pliable and tacky sheet of material. This is often referred to as a prepregging process. The precise specification of the fibers, their orientation and the formulation of the resin matrix can be specified to achieve the optimum performance for the intended use of the prepregs. The volume of fibers per square meter can also be specified according to requirements. The fiber reinforcement material may be in the form of a woven or nonwoven fabric ply, or continuous unidirectional fibers. The term "unidirectional fibers", as used herein, refers to a layer of reinforcement fibers that are aligned in the same direction. Although the fiber layers of first and second composite substrates 50, 72 remain distinct, the resin layers combine and become indistinguishable, forming a single, continuous component.

The reinforcement fibers 56 in the composite substrates 50, 72 (e.g. prepregs) may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. Woven fiber structures may comprise a plurality of woven tows, each tow composed of a plurality of filaments, e.g. thousands of filaments.

In some embodiments, the one or more reinforcement fibers 56 may include, but are not limited to, glass (including Electrical or E-glass), carbon (including graphite), aramid, polyamide, high-modulus polyethylene (PE), polyester, poly-p-phenylene-benzoxazole (PBO), boron, quartz, basalt, ceramic, nanotubes, carbon nanotubes, boron nitride nanotubes, gallium nitride nanotubes, single-walled nanotubes, multi-walled nanotubes, nanotube yarns, and combinations thereof.

The hardener rich curable resin 60 and the epoxy rich curable resin 78 of the first and second co-cure prepreg layers 58, 76 may individually intermix or diffuse into the first curable resin 54 of the first and second composite substrates 50, 72 during a reflow step described below that can be used to co-cure or secondary cure the first and second composite substrates 50, 72 to the first and second co-cure prepreg layers 58, 76, respectively. The excess polymerizable functional groups leave the first and second co-cure prepreg layer portions 68, 82 uncured and ready for subsequent assembly by undergoing additional co-cure steps in an out-of-autoclave and/or autoclave process.

When the first and second co-cure prepreg layers 58, 76 are coupled to the first and second composite substrates 50, 72, both the first and second co-cure prepreg layers 58, 76 and the respective composite structure may be heated at the first reflow temperature that may be lower than a first hardening temperature. As the first reflow temperature is applied to the first and second co-cure prepreg layers 58, 76 coupled to the first and second composite substrates 50, 72, the first curable resin 54, the hardener rich curable resin 60, and the epoxy rich curable resin 78 may each begin to reflow with the composite substrates 50, 72. In these off-set stoichiometry embodiments, the term "reflow," as used herein, means that the viscosity of the resin drops upon heating such that convective mass transport can occur while simultaneously the increase in temperature and drop in viscosity increase the molecular mobility which enables diffusive transport of mass to occur. During reflow, the functional groups contained within the first curable resin 54 of the first and second composite substrates 50, 72, such as amine and/or epoxy groups, may intermix and/or interdiffuse into the hardener rich curable resin 60 and the epoxy rich curable resin 78 of the first and second co-cure prepreg layers 58, 76. In addition, as part of the reflow, the functional groups in the hardener rich curable resin 60 and the epoxy rich curable resin 78 of the first and second co-cure prepreg layers 58, 76 may intermix and/or interdiffuse into the first curable resin 54 of the first and second composite substrates 50, 72, respectively. This mixing, migration, and/or diffusion, of functional groups within the first curable resin 54, hardener rich curable resin 60, and epoxy rich curable resin 78 allows the first and second composite structures 50, 72 to be co-cured or covalently bonded to the first and second co-cure prepreg layers 58, 76 to form the single covalently bonded composite substrate 86. Although a portion of the functional groups intermix between the layers, many of the respective functional groups remain located in their respective first and second co-cure prepreg layers 58, 76 or composite substrate 50, 72 areas. The first reflow temperature may be from about 25° C. to about 150° C., from about 25° C. to about 125° C., from about 25° C. to about 100° C., from about 50° C. to about 100° C., from about 50° C. to about 75° C., from about 75° C. to about 125° C., from about 75° C. to about 100° C., or from about 100° C. to about 125° C.

After the first reflow temperature is applied to intermix the functional groups of the first curable resin 54 with those in the hardener rich curable resin 60 and epoxy rich curable resin 78 of the two respective composite substrates 50, 72, the first curing cycle may be applied to co-cure the first and second co-cure prepreg layers 58, 76 to the first and second composite substrates 50, 72 respectively, until the first and second composite substrates 50, 72 are fully cured and the first and second co-cure prepreg layers 58, 76 are partially cured due to the excess of the respective functional group (e.g., amine or epoxy) remaining in the first and second co-cure prepreg layer portions 68, 82. The first curing cycle may include a variety of different temperature ramps and temperature holds to promote consolidation and mixing of the respective layers being co-cured and/or secondary cured. In some embodiments, the first curing cycle may include the first hardening temperature. The first hardening temperature and/or the first curing cycle may include temperature ramps and holds from about 50° C. to about 400° C., from about 50° C. to about 375° C., from about 50° C. to about 250° C., from about 75° C. to about 350° C., from about 75° C. to about 250° C., from about 100° C. to about 250° C., from about 125° C. to about 350° C., or be set at about 50° C., about 75° C., about 100° C., about 125° C., about 150° C., about 175° C., about 200° C., about 225° C., about 250° C., about 275° C., about 300° C., about 325° C., about 350° C., or about 375° C. The curing and polymerization slows when the first resin vitrifies meaning the glass transition temperature of the resin exceeds the curing temperature due to a high density of crosslinks typically formed when one of the epoxy precursors (amine hardener or epoxy monomer) is completely consumed. Once a thermoset resin is fully cured, it cannot be depolymerized or reflowed, therefore no subsequent consolidation or curing processes are possible.

When the first and second co-cure prepreg layer portions 68, 82 are coupled to each other, the respective composite structure may be heated at the second reflow temperature that may be lower than a second hardening temperature. As the second reflow temperature is applied to the first and second co-cure prepreg layer portions 68, 82, the hardener rich curable resin 60 may begin to reflow with the epoxy rich curable resin 78. In these embodiments, the amine and/or epoxy groups may intermix and/or interdiffuse between the hardener rich curable resin 60 and the epoxy rich curable resin 78 of the first and second co-cure prepreg layer portions 68, 82. This mixing, migration, and/or diffusion of functional groups between the hardener rich curable resin 60 and the epoxy rich curable resin 78, allows the first co-cure prepreg layer portion 68 to co-cure with the second co-cure prepreg layer portion 82 to form the monolithic covalently-bonded composite substrate 86. The second reflow temperature may be from about 25° C. to about 150° C., from about 25° C. to about 125° C., from about 25° C. to about 100° C., from about 50° C. to about 100° C., from about 50° C. to about 75° C., from about 75° C. to about 125° C., from about 75° C. to about 100° C., or from about 100° C. to about 125° C.

In the primary co-cure process, as with all prepreg lamination and cure processes, the viscosity of the uncured resin decreases upon heating allowing the resin to flow and the part to consolidate. The resin reflow and consolidation steps (debulk) are necessary to eliminate porosity, allow for intermixing at the ply interfaces and achieve full mechanical properties. Because of the offset stoichiometry in the hardener-rich (HR) curable resin 60 and hardener-poor (HP)/epoxy rich curable resin 78 layers, the resins remain flowable after the primary cure to the first and second composite substrates 50, 72. During the secondary co-cure step, intermixing of the HR and HP resins 60, 78 occurs to eliminate material discontinuity at the joint. By combining the HR and HP resins 60, 78 and performing the first and/or second reflow temperatures, the stoichiometric off-set is reduced or eliminated, and the molecular weight of the resin advances until vitrification occurs.

Figure 8:
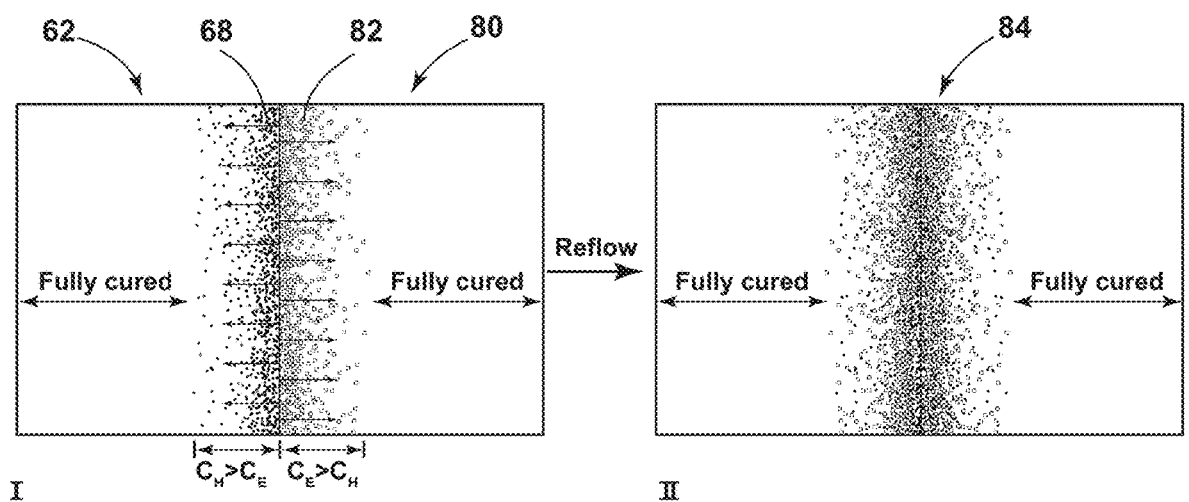
FIG. 8 is schematic representation of co-curing the co-cure prepreg layers having an off-set resin stoichiometry of a first composite substrate and a second composite substrate.

Referring now to FIG. 8, embodiments having the off-set stoichiometry approach using two resin formulations with complimentary off-set ratios is visually represented to show the effects of the second reflow temperature. There can be the epoxy rich curable resin 78 formulation that has a large excess of the epoxy resin which can be denoted as a "hardener poor (HP) resin" or "$C_E > C_H$". As this epoxy rich curable resin 78 of the second co-cure prepreg layer 76 is cured to the second composite substrate 72 as described above, the amine hardener is consumed at the beginning of the polymerization and the curing reaction stops. The complimentary resin is the hardener rich curable resin 60 formulated with a large excess of amine hardener which can be denoted as a "hardener rich (HR) resin" or "$C_H > C_E$". As the hardener rich curable resin 60 of the first co-cure prepreg layer 58 is cured to the first composite substrate 50 as described above, the epoxy monomer is consumed and limits the progress of the polymerization reaction. Image I of FIG. 8 shows the first co-cure prepreg layer portion 68 coupled to the second co-cure prepreg layer portion 82 before the second reflow temperature is applied. As can be seen in Image I, when the first co-cure prepreg layer portion 68 is first coupled to the second co-cure prepreg layer portion 82, the respective off-set stoichiometry regions can be represented as the predominately amine region ($C_H$>$C_E$) and the predominately epoxy region ($C_E$>$C_H$). Upon application of the second reflow temperature, the respective hardener rich curable resin 60 and epoxy rich curable resin 78 have a reduction in viscosity and can mix with each other's complementary functional group. Image II of FIG. 8 shows the intermixed epoxy and amine functional groups in an intermixed co-cure layer 84 after the second reflow temperature is applied so that the second curing cycle can be applied to fully cure the interface resulting in the monolithic covalently-bonded composite structure 86.

After the second reflow temperature is applied to intermix the functional groups of the hardener rich curable resin 60 and the epoxy rich curable resin 78 of the first and second co-cure prepreg layer portions 68, 82, the second curing cycle may be applied to co-cure the intermixed co-cure layer 84 or the first and second co-cure prepreg layer portions 68, 82. The second curing cycle may include a variety of different temperature ramps and temperature holds to promote consolidation and mixing of the respective layers being co-cured and/or secondary cured. In some embodiments, the second curing cycle may include the second hardening temperature. The second hardening temperature and/or the second curing cycle may include temperature ramps and holds from about 50° C. to about 400° C., from about 50° C. to about 375° C., from about 50° C. to about 250° C., from about 75° C. to about 350° C., from about 75° C. to about 250° C., from about 100° C. to about 250° C., from about 125° C. to about 350° C., or be set at about 50° C., about 75° C., about 100° C., about 125° C., about 150° C., about 175° C., about 200° C., about 225° C., about 250° C., about 275° C., about 300° C., about 325° C., about 350° C., or about 375° C.

In alternate embodiments, the amine/epoxy system could be replaced with any other condensation polymer systems useful for making composite structures: polyurethanes, polyureas, polyimides, bismaleimides etc. Alternate methods are possible where all joining surfaces contain HP resin. For example, two components, both having the HP resin joining surfaces, are joined with a HR resin film or prepreg sheet between them. The complimentary embodiment is also possible where all components are fabricated with HR resin in the joining surfaces. The HR resin surfaces are joined with a HP resin film or prepreg sheet between them. In all embodiments, the same standard composite manufacturing practices could be applied to fabricate and assemble the components.

In some embodiments, the stoichiometric offset, r, is defined as the ratio of molar equivalents of amine hardener reactive groups to the molar equivalents of epoxy reactive groups. Assuming full conversion of the limiting reactive group to form polymer, the resin cannot gel or vitrify when the stoichiometric off-set is 0.33>r>3.0. In some embodiments, the first off-set amine to epoxide ratio of the first co-cure prepreg layer is less than about 0.3 and the second off-set amine to epoxide ratio of the second co-cure prepreg layer is greater than about 3.3. In other embodiments, the first off-set amine to epoxide molar ratio of the first co-cure prepreg layer is about 0.3. In still other embodiments, the second off-set amine to epoxide molar ratio of the second co-cure prepreg layer is about 3.3. In additional embodiments, either of the co-cure prepreg layers may have an off-set amine to epoxide molar ratio of about 0.01, about 0.1, about 0.15, about 0.2, about 0.25, about 0.3, about 0.35, about 0.4, about 0.45, about 0.5, about 2, about 2.2, about 2.5, about 2.85, about 3.3, about 4, about 5, about 6.6, about 10, or about 100. Although any of these above-mentioned stoichiometric offset molar ratios may be used, the complementary co-cure prepreg layer can be formulated to completely complement, offset, or balance out the overall stoichiometry of the respective functional groups in the prepreg layers. For example, a ratio (r) of 0.1 of hardening functional groups in one prepreg layer can vitrify or gel with another prepreg layer having a ratio (r) of 10.

In other embodiments, the stoichiometric offset, r, can be defined as the ratio of molar equivalents of a first hardener reactive group to the molar equivalents of a second hardener reactive group. Assuming full conversion of the limiting reactive group to form the polymer, the resin cannot gel or vitrify when the stoichiometric off-set is 0.33>r>3.0. In some embodiments, the first hardener reactive group to second hardener reactive group ratio of the first co-cure prepreg layer is less than about 0.3 and the second first hardener reactive group to second hardener reactive group ratio of the second co-cure prepreg layer is greater than about 3.3. In other embodiments, the first off-set amine to epoxide molar ratio of the first co-cure prepreg layer is about 0.3. In still other embodiments, the second first hardener reactive group to second hardener reactive group ratio of the second co-cure prepreg layer is about 3.3. In additional embodiments, either of the co-cure prepreg layers may have an off-set first hardener reactive group to second hardener reactive group molar ratios of about 0.01, about 0.1, about 0.15, about 0.2, about 0.25, about 0.3, about 0.35, about 0.4, about 0.45, about 0.5, about 2, about 2.2, about 2.5, about 2.85, about 3.3, about 4, about 5, about 6.6, about 10, or about 100. In some embodiments, the values selected for the molar ratio (r) of the first hardener reactive group to second hardener reactive group in the two layers to be co-cured should be selected to complement each other; for example, a molar ratio (r) of 0.25 in the first co-cure prepreg layer 58 should be used with the molar ration (r) of 4 in the second co-cure prepreg layer 76. In other embodiments where complementary offset resin layers are sandwiched between prepreg layer portions 68, 82, the molar ratio (r) of the complimentary offset resin layer can be selected to complement the first and second prepreg layer portions 68, 82 having their own respective molar ratio (r) values.

The respective functional groups in the first and second co-cure prepreg layers 58, 76 that react with the complementary residual functional groups in the first and second composite layers 50, 72 are expected to maintain their respective ratios through the co-cure and/or secondary cure processes so the relative reactivities should be maintained between the first and second co-cure prepreg layers 58, 76 and the first and second prepreg layer portions 68, 82 throughout the process.

It is understood that the descriptions outlining and teaching the first, second, and third embodiments of the invention for bonding composite structures previously discussed, which can be used in any combination, apply equally well to the fourth embodiment of the invention, where applicable, further disclosing a method for bonding composite substrates. The above-referenced disclosure describing curatives, curing inhibitors, catalysts, and inorganic fillers can all be applied to the compositions and methods disclosed for the off-set stoichiometry techniques.

In a fifth embodiment, the present invention provides a method for bonding composite substrates including: providing the first co-cure prepreg layer 58 cured to the surface 64 of the first composite substrate 50 wherein the first co-cure prepreg layer 58 includes the first off-set amine to epoxide molar ratio of less than about 0.3. The method additionally includes providing the second co-cure prepreg layer 76 cured to the surface 64 of the second composite substrate 72 wherein the second co-cure prepreg layer 76 includes the second off-set amine to epoxide molar ratio of greater than about 3.3. The method also includes coupling the first co-cure prepreg layer portion 68 cured to the first composite substrate 50 to the second co-cure prepreg layer portion 82 cured to the second composite substrate 72, applying the first reflow temperature to the coupled first and second co-cure prepreg layers 58, 76, and applying the first curing cycle to couple the first co-cure prepreg layer 58 of the first composite substrate 50 to the second co-cure prepreg layer 76 of the second composite substrate 72 to form the monolithic covalently-bonded composite structure 86.

It is understood that the descriptions outlining and teaching the method for bonding composite structures previously discussed, which can be used in any combination, apply equally well to the fifth embodiment of the invention, where applicable, further disclosing a method for bonding composite substrates.

The first and second co-cure prepreg layers 58, 76 can be applied to the entire surface 64 of the respective first and second composite substrates 50, 72. For the off-set stoichiometry approach, the second reflow step is used to get the stoichiometry of the respective functional groups back to a desired ratio so the desired polymerization co-cure process can occur. Portions of the first and second co-cure prepreg layers 58, 76 that are not coupled to the complementary layer will likely not be able to fully cure. In the embodiments disclosed herein, the percent completion of total reacted function groups may exceed about 75%, about 80%, about 85%, about 90%, about 95%, about 99%, and/or about 99.9%. For example, a percent completion of about 95% means about 95% of the respective amine and/or epoxy functional groups have reacted to form the composite structure. Layers that have unreacted functional groups may still be able to function in the desired applications as disclosed herein.

In a sixth embodiment, the invention is a co-curable composite structure including: the first uncured or partially cured composite substrate 50 comprising one or more reinforcement fibers 56 and the first curable resin 54 herein the first curable resin 54 includes an epoxide and an amine and the first co-cure prepreg layer 58 on the surface 64 of the first uncured or partially cured composite substrate 50 wherein the first co-cure prepreg layer 58 comprises an off-set amine to epoxide ratio of less than about 0.3 or greater than about 3.3. The first uncured or partially cured composite substrate 50 and the first co-cure prepreg layer 58 are cured together at the first curing cycle until the first uncured or partially cured composite substrate 50 and the first co-cure prepreg layer 58 are functionally cured to form the co-curable composite structure. The amine or epoxide in a stoichiometric excess remain latent until an additional co-cure step.

It is understood that the descriptions outlining and teaching the method for co-cure bonding composite structures previously discussed, which can be used in any combination, apply equally well to the sixth embodiment of the invention, where applicable, further disclosing a co-curing composite structure.

It will be understood by one having ordinary skill in the art that construction of the described device and other components is not limited to any specific material. Other exemplary embodiments of the device disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It will be understood that any described processes or steps within described processes may be combined with other disclosed processes or steps to form structures within the scope of the present device. The exemplary structures and processes disclosed herein are for illustrative purposes and are not to be construed as limiting.

EXPERIMENTAL

The following materials were used as received: Etha-cure 100 from the Albermarle Corporation, p-toluene sulfonic acid monohydrate, methylisobutylketone (MIBK), aniline, imidazole, diethyl ether, hexanes, and deuterated chloroform (CDCl3) and dimethysulfoxide (d6-DMSO) from Sigma Aldrich, p-tolualdehyde from Kodak, toluene from Acros Organics, and acidic alumina from Fisher Scientific. DER 331 epoxy resin from Dow Chemical Co. was dried under vacuum at 50° C. for at least 72 h before use. The m-phenylenediamine obtained from Sigma Aldrich was purified by vacuum distillation. Prepreg was prepared from unsized HEXTOW® IM7 carbon fiber from HEXCEL®. Torayca P2302-19 (T800H/3900-2), a commercially-available, unidirectional prepreg tape, was obtained from Toray America. Methyl ethyl ketone (MEK), used to dilute the resin for prepreg preparation, was used as obtained from Sigma Aldrich.

A Thinky planetary mixer was used to mix and de-gas all resin formulations before curing in a forced-air oven using the manufacturer recommended cure cycle: 2 hours at 100° C. followed by 4 hours at 175° C. Cured resins were cryogenically fractured at −79° C. to prepare powders. The powder samples (0.7 g) were pressed into disks used for parallel plate rheology conducted on a TA Instruments ARES rheometer using disposable, steel, parallel plate fixtures with an initial gap of 1 to 1.5 mm and a 25 mm upper plate diameter. The temperature was ramped at 10° C./min and held isothermally at 50, 100, 150, and 175° C. for 20 min to measure constant viscosity at each hold temperature. A measurement was collected every 30 seconds by applying 15% strain at 10 rad/s.

The interdiffusion of resins during co-cure was measured by reformulating off-set epoxy resins with hardeners containing heteroatoms that could be detected by scanning electron microscopy (SEM, Hitachi S-5200) and energy dispersive spectroscopy (EDS, Thermo Electron Ultradry with Noran System 7 Spectral Imaging). Neat resin films were prepared from off-set formulations and co-cured in a heated press. Interdiffusion distance at the co-cured interface was measured by SEM/EDS on polished cross-section samples. The heteroatom containing hardener in the HP film was 2,2'-bis(4-aminophenyl) hexafluoropropane (6-FD-PDA), and 4,4'-diaminophenyl sulfide (DAS) was used in the HR film. The hardness of the co-cured film was measured across the interface using a Vickers microindenter Micromet 2124 from Buehler.

Unidirectional prepreg tape was prepared using a custom prepregger from a resin solution of 70 wt % resin and 30 wt % MEK. Ten-ply composite panels were prepared by laying up the Toray prepreg and co-cure-ply prepreg in a 30 cm by 30 cm format. The following notation is used to indicate the layup of a panel: [$Toray_n/R=r_m$] where $Toray_n$ indicates n layers of Toray prepreg and $R=r_m$ indicates m layers of co-cure-ply prepreg with a stoichiometric offset ratio of r. The primary co-cure on each panel was conducted in an autoclave using the manufacturer recommended cure cycle. The parameters for the secondary co-cure process were modified according to Table 1. The panels were machined using a water jet to prepare specimens for microscopy and double cantilever beam (DCB) testing according to a modification of ASTM 5528-13. Table 1 shows the layups tested in this work.

Imines can be prepared in a number of ways. If primary amines are readily reactive with aldehydes or ketones, there is no need for a catalyst or solvents to form the imine. In the case where aldehydes are used to protect a primary amine, the reaction is so spontaneous that it can progress to completion within minutes. Imines can be prepared from ketones with amines using an acid catalyst in refluxing toluene during an azeotropic distillation. Although solvents and catalysts are not required, this method is ideal when trying to ensure a homogeneous reaction mixture. Imines prepared neat with mild heating and vacuum may quickly solidify, which prevents further mixing. This method is only ideal if a solvent is introduced for a subsequent purification of imine process because it will ensure that the reagents will mix and react completely during the work up.

A number of imines were synthesized and used to advance the understanding of imine chemistry as it relates to this project. Initially ethacure 100 was selected as the ideal amine because it is difunctional (two amine groups), commercially available, and widely used for epoxy hardening. It is difficult to isolate pure products and interpret spectral data when using ethacure 100 because it reacts to yield an 80/20 mixture of stereoisomers.

To better identify changes in properties between amines and imines, aniline was used as a model because it is a simple, aromatic, primary amine. Derivatives of aniline were used to determine kinetic parameters of the protection/deprotection reaction. Because aniline is not a difunctional amine, it could not be used as an epoxy hardener to form crosslinked polymers. M-phenylenediamine was used as a comparison to ethacure 100 for the preparation of polymers. The aldehydes or ketones used to protect the molecule were either methyl isobutyl ketone (MIBK) or p-tolualdehyde. In some cases only aldimines formed, but both ketimines and aldimines were attempted for each amine. All of the amines and imines were characterized through $^1$H NMR, $^{13}$C NMR, GC-MS and FT-IR spectroscopy.

Ketimines were prepared using the generalized scheme as follows. Ethacure 100 (10 g) is placed in a 300 mL three neck round-bottom flask fitted with a magnetic stirrer, reflux condenser, nitrogen inlet, oil bubbler, and moisture trap. A ketone (e.g. MIBK) was added in excess (2.5 mol equivalents based on amine groups) and enough toluene was added to achieve ~20% solids based on the theoretical yield. P-toluene sulfonic acid monohydrate (0.05 mol %) was added and the reaction was heated to reflux overnight. Progress was monitored by observing the volume of water collected in the moisture trap. The anhydrous workup involved removal of solvent by atmospheric distillation followed by vacuum distillation (130° C., 0.7 mmHg) of the product that was recovered as a light yellow oil in moderate yield.

Aldimines were prepared using the generalized scheme as follows. Five grams of amine and a stoichiometric amount (based on amine groups) of aldehyde were mixed in a 100 mL three neck round-bottom flask equipped with a nitrogen inlet, oil bubbler, and magnetic stirrer. The neat reaction mixture quickly crystallized and then formed water droplets on the flask walls at room temperature over 2 to 5 hours. Water was removed by heating to 80° C. at reduced pressure (100 mmHg). The products were purified by recrystallization from ether or hexane.

Reaction products were characterized with a Bruker (Avance 300) Multinuclear Spectrometer operating at 300.152 MHz and a Thermo Scientific attenuated total reflectance Fourier transform infrared spectrometer (ATR-FTIR). Thermal analysis was performed on a SETARAIVI DSC131 differential scanning calorimeter (DSC) and a TA Instruments Ares rheometer. The DSC was programmed to heat at 20° C./min to 120° C. followed by cooling at 50° C./min to 0° C. and a second heating cycle at 20° C./min to 120° C. The $T_g$ was measured during the second heating step. The rheometer was programmed to follow the standard heating cycle recommended by Dow Chemical Co. to heat the DER 331 epoxy resin to 100° C. for 2 h followed by 175° C. for 4 h under flowing nitrogen gas.

Example 1—Synthesis of Model Aldimine

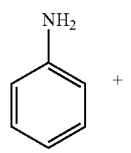

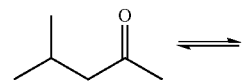

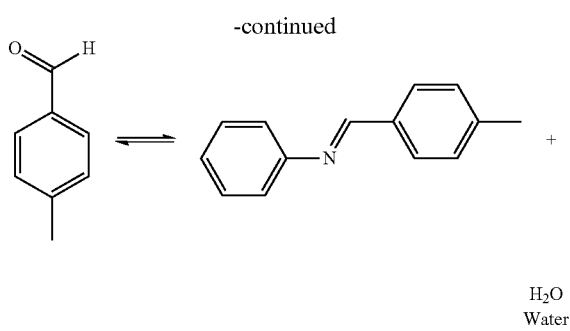

The amine group of aniline was protected by adding p-tolualdehyde to a three neck round-bottom flask fitted with a nitrogen inlet, and bubbler. Additionally, a stir bar, stirring hot plate, and silicone oil bath were used during the reaction. Equimolar stoichiometric amounts of aniline and p-tolualdehyde were added to the flask while vigorously stirring the solution. The flask was purged with a stream of nitrogen gas for 10 minutes and heated to 80° C. The mixture solidified quickly and temperature was constant for 30 minutes. The flask was then placed under vacuum using a water aspirator to remove residual water remaining in the solution. Hexanes were then added to the flask and the flask was heated until the solid was completely dissolved. The product was recrystallized from hexanes and was filtered using a Büchner funnel. The product was then placed in a vacuum oven and heated to remove any residual solvent. The resulting pure product was (E)-N-(4-methylbenzylidene) aniline (aniline aldimine). The product was a light yellow in color with a 28% yield.

$^1$H NMR (CDCl$_3$, 300 MHz): δ2.45 (s, 3H), 7.42-7.18 (m, 7H), 7.84 (d, 2H, J=7.92 Hz), 8.46 (s, 1H). $^{13}$C NMR (CDCl$_3$, 75 MHz): δ 21.88, 121.13, 126.02, 129.12, 129.38, 129.78, 160.62. FT-IR 3029 cm$^{-1}$ (C—H), 1579 cm$^{-1}$ (C=N); mp: 44.6° C.

Example 2—Synthesis of Ketimine

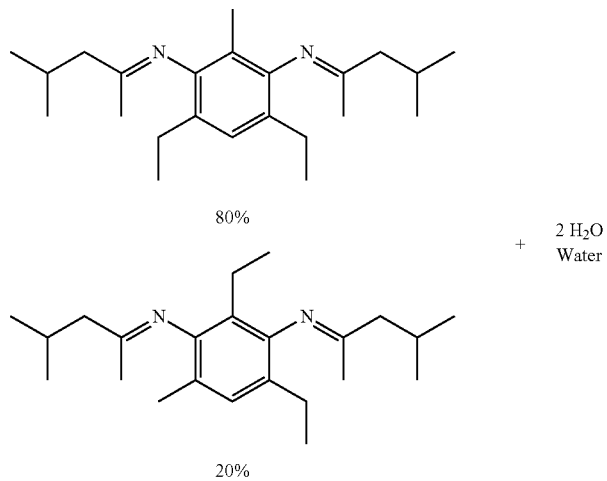

A three neck round-bottom flask was fitted with a nitrogen inlet, reflux condenser and Dean-Stark distillation trap. The system was purged with nitrogen through a rubber septum fitted in the reflux condenser with an 18 ga. needle connected to an oil trap. A stir bar, stirring hot plate, and silicone oil bath were also used during the reaction. The flask was charged with toluene as a solvent, stoichiometric amounts of ethacure 100 and MIBK, and 0.01 mol of p-toluenesulfonic acid monohydrate as a catalyst. The flask was purged with a stream of nitrogen gas for 10 minutes with vigorous stirring. The reaction was heated to reflux while utilizing glass wool and aluminum foil as insulation. The mixture was held at reflux until the water collected in the Dean-Stark trap reached the theoretical yield or ceased to accumulate additional water. The contents of the Dean-Stark trap were drained and residual toluene was distilled from the reaction mixture. The remaining residue was vacuum distilled using a Vigreux column (pressure 0.57 torr, vapor temp. 145-147° C.). The resulting product was (N1E,N3E)-2,4-diethyl-6-methyl-N1,N3-bis(4-methylpentan-2-ylidene)benzene-1,3-diamine compound with (N1E,N3E)-4,6-diethyl-2-methyl-N1,N3-bis(4-methylpentan-2-ylidene)benzene-1,3-diamine (80:20) (ethacure 100 ketimine). The final pure product was clear yellow in color, with an 89% yield. This product darkens as it is exposed to air and light.

$^1$H NMR (CDCl$_3$, 300 MHz): δ0.80 (t, 6H, J=9 Hz), 0.94 (d, 6H, J=4.5 Hz), 1.01 (t, 4H, J=8.7 Hz), 1.14 (m, 2H), 1.59-1.46 (m, 6H), 1.87-1.73 (s, 3H, J=18 Hz), 2.41-1.87 (m, 10H), 6.76-6.62 (d, 1H). $^{13}$C NMR (CDCl$_3$, 75 MHz): δ21.88, 121.13, 126.02, 129.12, 129.38, 129.78, 139.78, 140.22, 160.62. FT-IR 2959 cm$^{-1}$ (C—H), 1636 cm$^{-1}$ (C═N).

Example 3—Synthesis of Aldimine

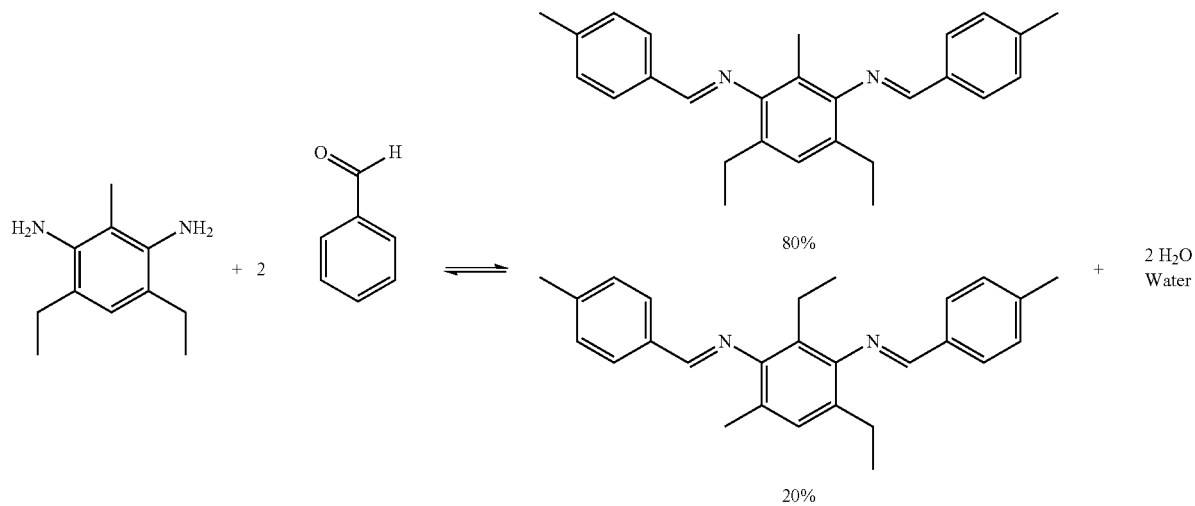

The synthetic method used for the ethacure 100 aldimine was similar to that of ethacure 100 ketimine with some modifications. No p-toluene sulfonic acid catalyst was used in the reaction. Crystal growth occurred very slowly (>12 h). The resulting products were (N1E,N3E)-2,4-diethyl-6-methyl-N1,N3-bis(4-methylbenzylidene)benzene-1,3-diamine compound and (N1E,N3E)-4,6-diethyl-2-methyl-N1,N3-bis(4-methylbenzylidene)benzene-1,3-diamine (80:20) (ethacure 100 aldimine). The product appeared to be amber in color with better than 80% yields.

$^1$H NMR (CDCl$_3$, 300 MHz): δ0.93, 1.14 (t, 6H), 2.12, 1.92 (s, 3H), 2.43 (m, 10H), 6.59 (s, 1H), 7.30 (d, 4H), 7.81 (d, 4H), 8.21 (m, 2H) $^{13}$C NMR (CDCl$_3$, 75 MHz): δ13.92, 14.38, 15.08, 18.39, 20.37, 21.80, 24.61, 24.80, 63.24, 122.07, 123.96, 126.29, 128.27, 128.72, 129.68, 129.93, 133.82, 142.00, 149.48, 162.18, 162.49, 165.65. FT-IR 2964 cm$^{-1}$ (C—H), 1640 cm$^{-1}$ (C═N); mp 121.7° C.

Example 4—Synthesis of Aldimine

This imine was synthesized in a round bottom flask using a stir bar, stirring hot plate, and silicone oil bath was used during the reaction. The reagents were mixed neat with vigorous stirring. Within 10 minutes, the entire mixture solidified. The mixture was then placed under vacuum using a water aspirator. The solid remains were then completely dissolved into ethyl ether with applied heat. The pure product was then recrystallized from ethyl ether and filtered using a Büchner funnel. The product was then placed in a vacuum oven and heated to remove any residual ethyl ether. The resulting product was (N1E,N3E)-N1,N3-bis(4-methylbenzylidene)benzene-1,3-diamine (m-phenylenediamine aldimine). The product appeared to be a green solid in low yield.

$^1$H NMR (CDCl$_3$, 300 MHz): δ2.51 (s, 1H), 3.33 (s, 10H,), 7.34, 7.12 (d, 6H), 7.85 (d, 2H) 8.65 (s, 1H). $^{13}$C NMR (CDCl$_3$, 75 MHz): δ19.61, 21.24, 21.87, 22.13, 60.58, 63.49, 95.21, 113.19, 118.74, 129.13, 129.96, 130.09, 142.22, 153.44, 160.86, 182.22, 192.20. FT-IR 2917 cm$^{-1}$ (C—H), 1567 cm$^{-1}$ (C═N); mp: 108.3° C.

Example 5—Kinetic Testing for Deprotection of Imine

The activation of a model aldimine compound with water to form an amine was observed in solution phase. A series of NMR experiments were carried out in d$_6$-DMSO with an equimolar stoichiometric amounts of water added to a known concentration of aniline aldimine. Five series were done; two with acidic alumina or imidazole catalysts, and three with no catalysts at different temperatures of 21, 30, and 42° C. The integration value of the imine, water, and

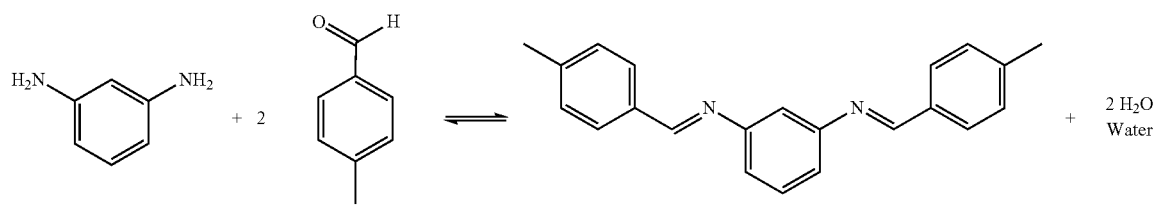

aldehyde protons, at chemical shifts of 8.54, 3.36, and 9.94 ppm, respectively, were monitored to measure the consumption of imine and production of aldehyde. The reaction was assumed to follow a second order reversible rate law. A linearized form of the rate law was adapted from Hassan et al.

$$-\frac{d[\text{Aldimine}]}{dt} = k\left\{[\text{H}_2\text{O}][\text{Aldimine}]) - \frac{[\text{Aniline}][\text{Aldehyde}]}{K_{eq}}\right\}$$

The integration of above equation:

$$\ln\left[\frac{(1+MR+a_2-2a_1X)(1+MR-a_2)}{(1+MR-a_2-2a_1X)(1+MR+a_2)}\right] = ka_2[\text{Aldimine}]_0 t \quad \text{Equation 1}$$

Where:

$$MR = \text{Molar Ratio} = \frac{\frac{X^0_{Water}}{2} + X^0_{Aldehyde}}{(1 - X^0_{Aldehyde})};$$

$$X = X^t_{Aldehyde};$$

$$\alpha_1 = \left(1 - (K_{eq})^{-1}\right);$$

$$a_2 = \sqrt{(1+MR)^2 - 4a_1 MR}$$

The molar ratio (MR) is dimensionless, and is in terms of initial water $X_{Water}^0$ and initial aldehyde $X_{Aldehyde}^0$ mole fractions. X is the fractional conversion of imine into aldehyde. To calculate the constant $a_1$, the only value needed is the equilibrium constant ($k_{eq}$) which can be determined from the mole fractions measured at equilibrium.

Figure 3:
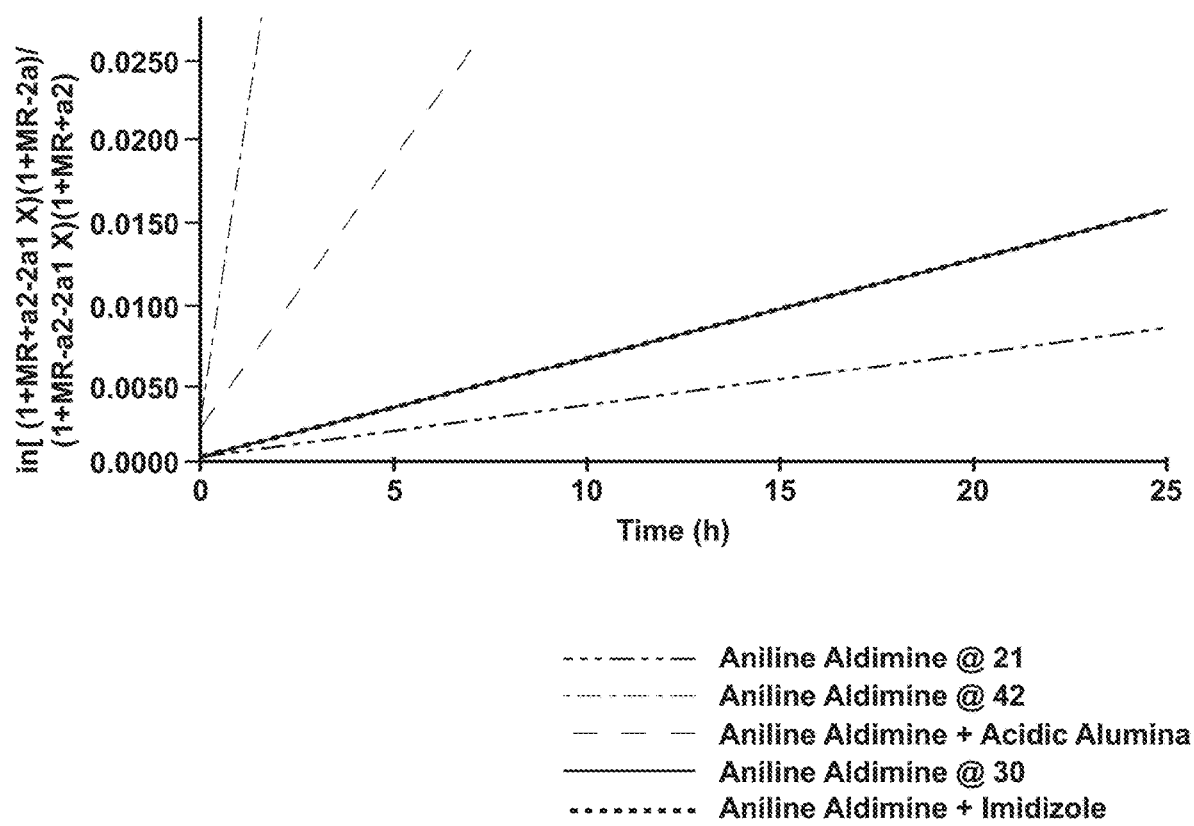
FIG. 3 is a graph showing the reversible second order kinetics for aldehyde formation of imine with water.

FIG. 3 was created using the best fitting data from the consumption of imine series. Equation 1 was used to plot this graph and determine the rate of imine consumption over time. Linear least-squares regression analysis resulted in an $R^2>0.97$ for the data in FIG. 3. The greatest increase in rate came from an increase in temperature for the reaction to 42° C. The addition of the acidic alumina as a catalyst was the second fastest increase to the rate for the reaction. The plotted data shows that an increase in temperature to 30° C. has almost the same effect on the reaction as the imidazole catalysts. The lowest rate, as expected, was the reaction at room temperature with no catalyst.

TABLE 1

Figure 5A:
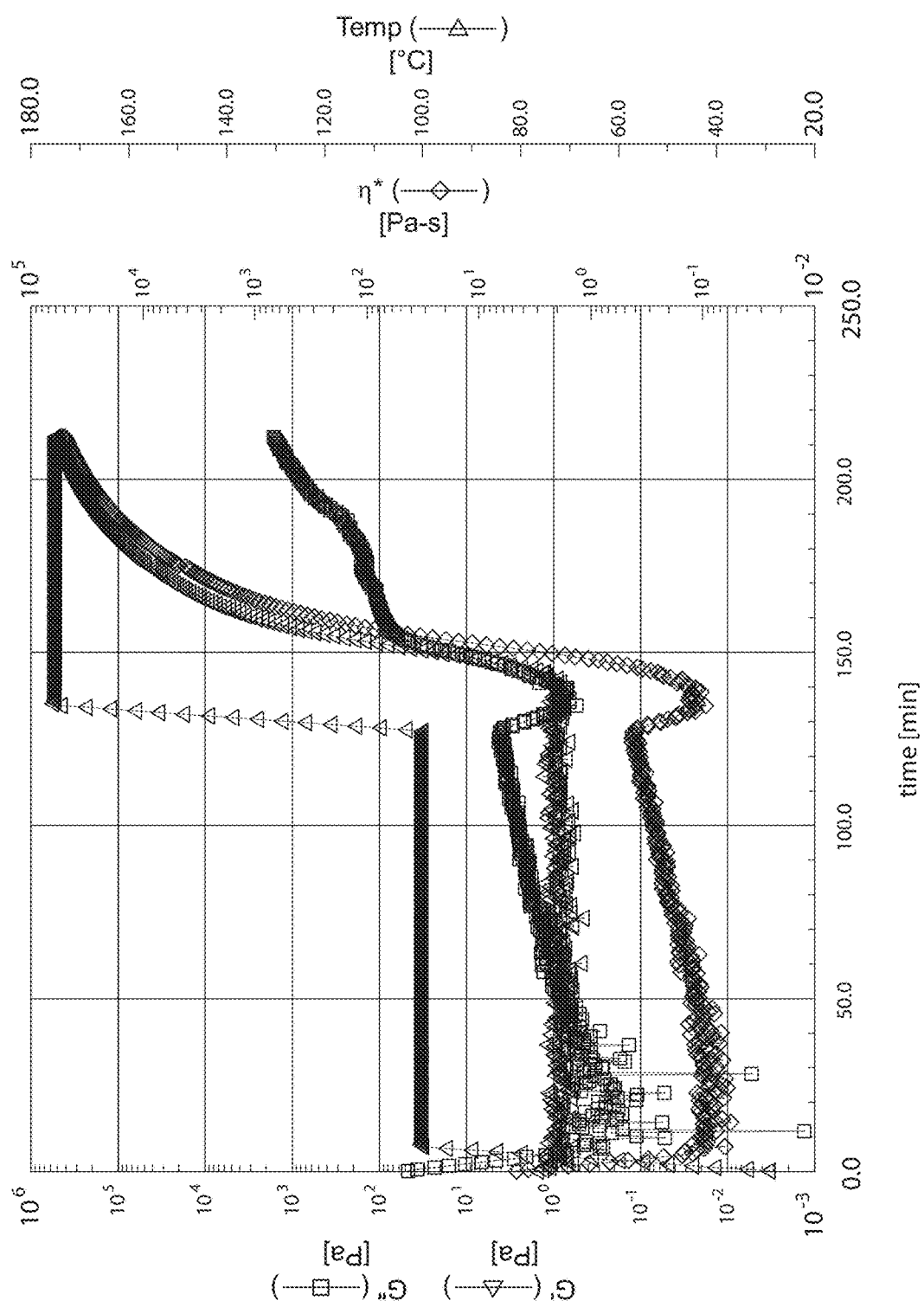
FIG. 5A is a graph showing rheometer results for Ethacure 100 Ketimine with imidazole catalyst mixed with dry DER 331.
Figure 5B:
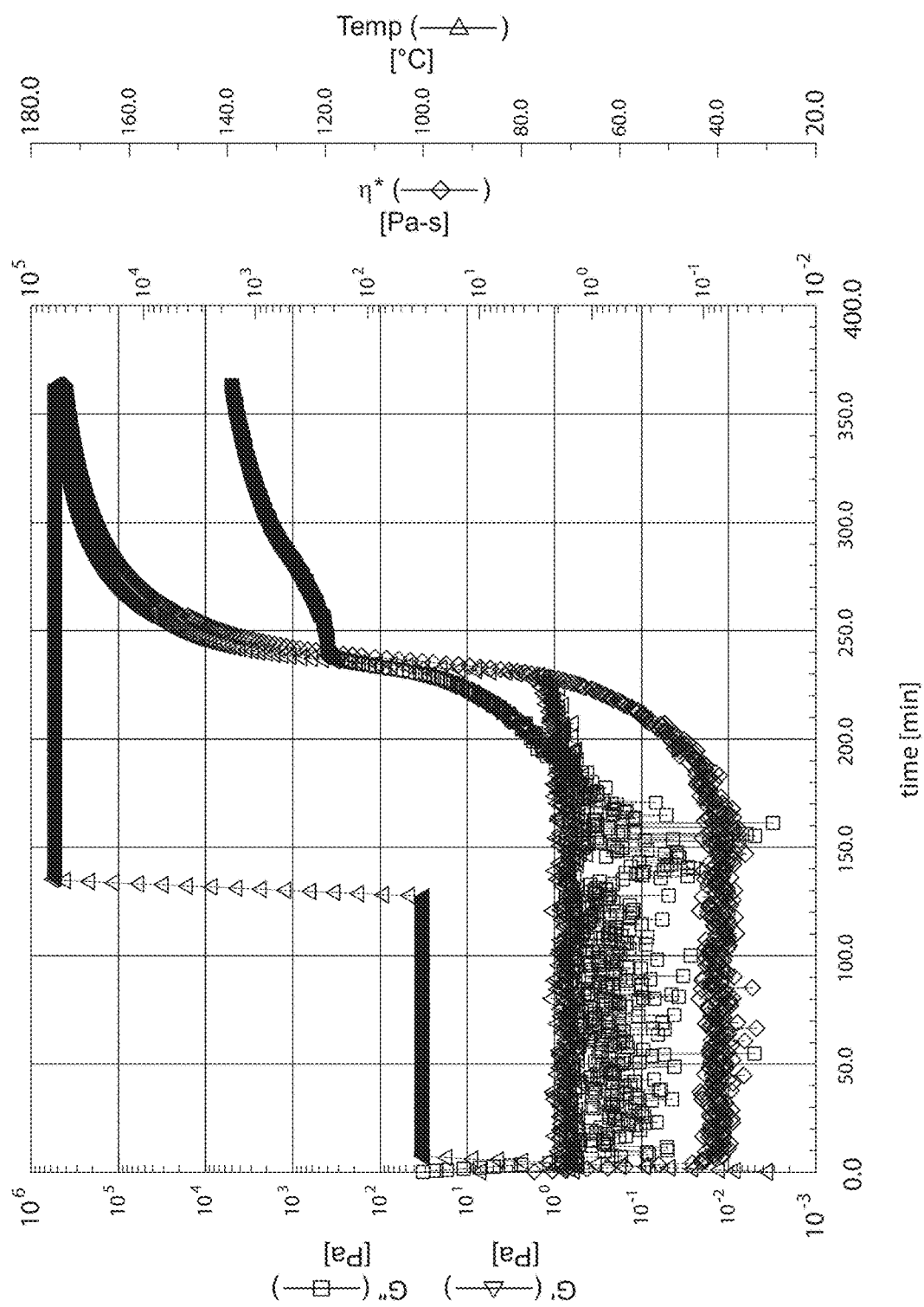
FIG. 5B is a graph showing rheometer results for Ethacure 100 Ketimine with acidic alumina catalyst mixed with dry DER 331.

Kinetic and equilibrium constants from time-resolved NMR experiments for the hydrolysis of aniline aldimine (see FIG. 5).

| Catalyst | $k_f$ (L/mol h) | $K_{eq}$ | $X^E$ |
|---|---|---|---|
| None | 0.87 | 52.2 | 0.86 |
| Acidic alumina | 2.63 | 57.7 | 0.84 |
| Imidazole | 1.96 | 55.1 | 0.85 |

$K_{eq}$ is the equilibrium constant, $k_f$ is the forward rate constant, and $X^E$ is the equilibrium fractional conversion of amine.

Table 1 shows that both $K_{eq}$ and $X^E$ are independent of the catalyst type, but acid alumina accelerates the reaction by a factor of 3 and imidazole accelerates the reaction by 2.25.

TABLE 2

The kinetic and equilibrium constants from time-resolved NMR experiments for the hydration of aniline aldimine (see FIG. 3).

| Temperature ° C. | $k_f$ (L/mol h) | $K_{eq}$ | $X^E$ |
|---|---|---|---|
| 21.1 | 0.87 | 52.2 | 0.86 |
| 30.0 | 3.19 | 44.8 | 0.83 |
| 42.3 | 45.0 | 30.8 | 0.75 |

Much like the catalysts, temperature does not affect $K_{eq}$ or $X^E$ as shown in Table 2 but has a strong effect on the rate constants. Temperature accelerates the reaction when it is 30.0° C. by a factor of 3.6, and when it is 42.3° C. by a factor of 51.7.

Example 6—Rheology Study

A rheometer was used to see if protection chemistry inhibited crosslinking and polymerization in an epoxy resin. This experiment traced the viscosity of the resin, showing if it went from its initial state, a viscous liquid ($\eta<1$ kPa-s), to a glassy state ($\eta>40$ kPa-s). Advancement of an epoxy polymerization was monitored by a buildup in the viscosity at a constant temperature. Hardeners were mixed with DER 331 and a standard cure cycle was performed in the rheometer. The standard cure cycle recommended by the epoxy manufacturer was two hours at 100° C. followed by 175° C. for four hours. In some cases, vitrification of the resin caused the rheometer to overload and prematurely end the experiment. Nitrogen was used in the system because moisture in the air could cause deprotection and skew results. If the rheometer did not overload during the cure cycle, this indicated that the imine protecting chemistry inhibited polymerization more than cure cycles that reached overload. This indicated that the resin could be prevented from fully curing under common manufacturing conditions.

Figure 4A:
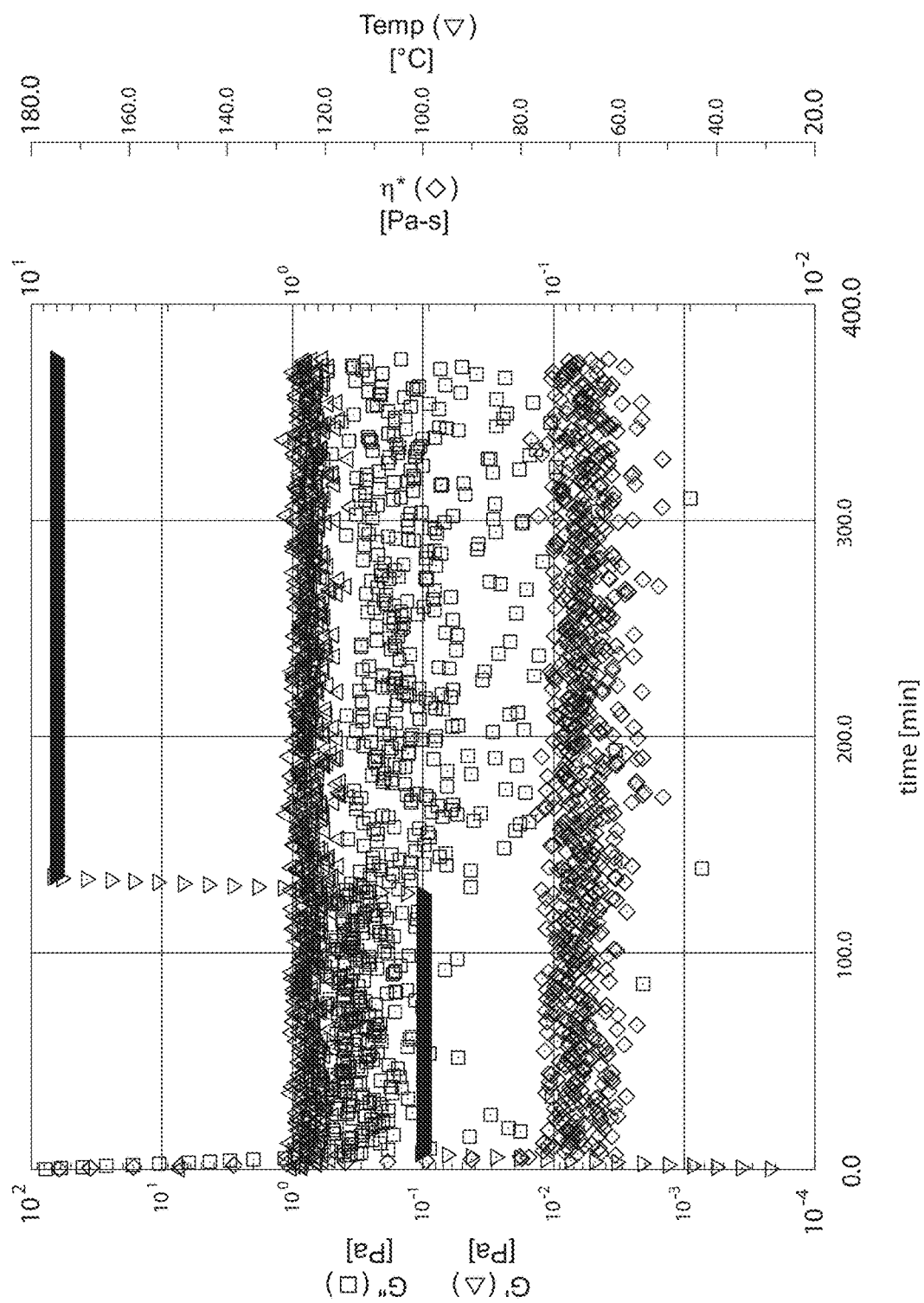
FIG. 4A is a graph showing rheometer results for dry DER 331 without hardener.
Figure 4B:
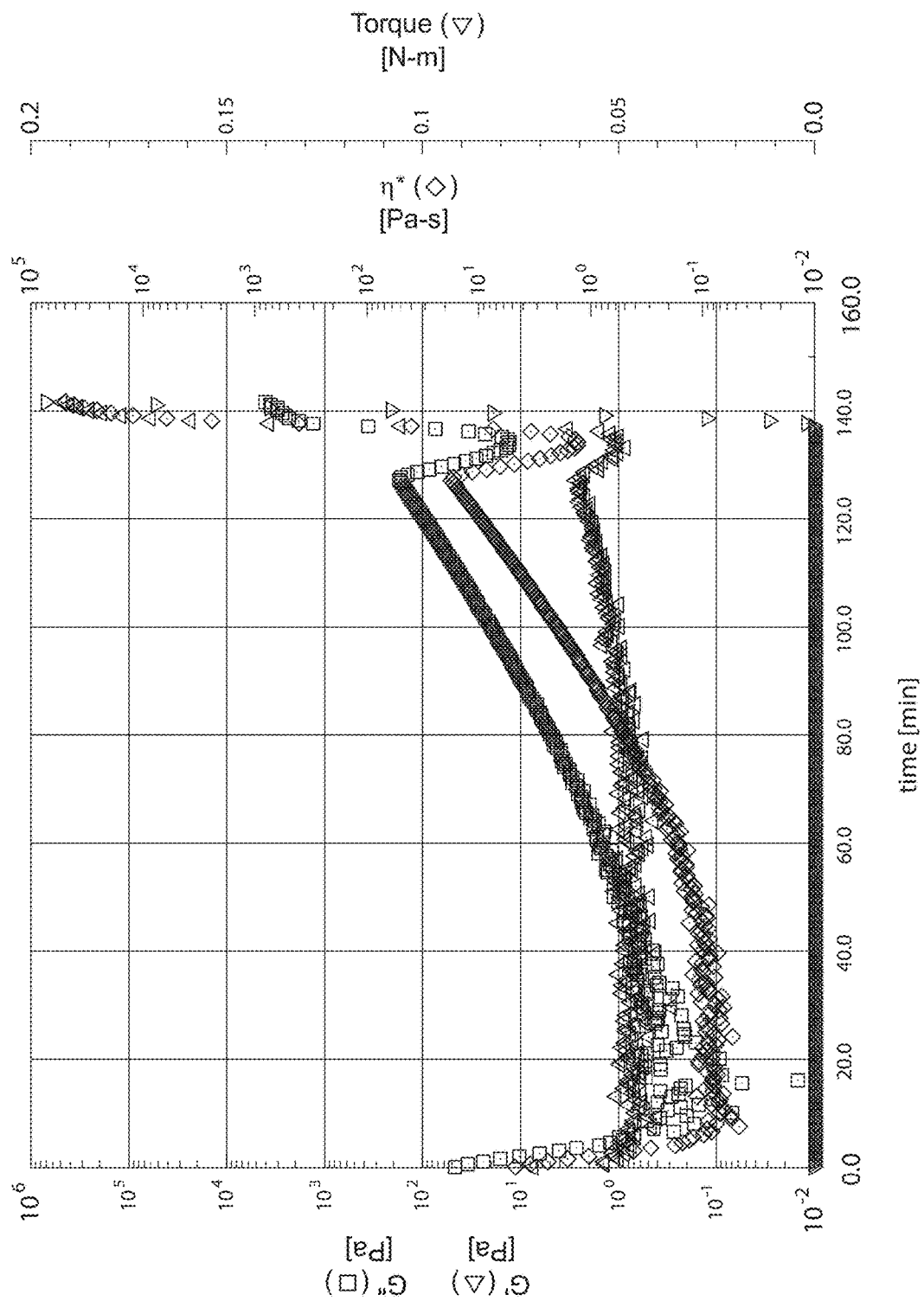
FIG. 4B is a graph showing rheometer results for dry DER 331 mixed with unprotected ethacure 100.
Figure 4C:
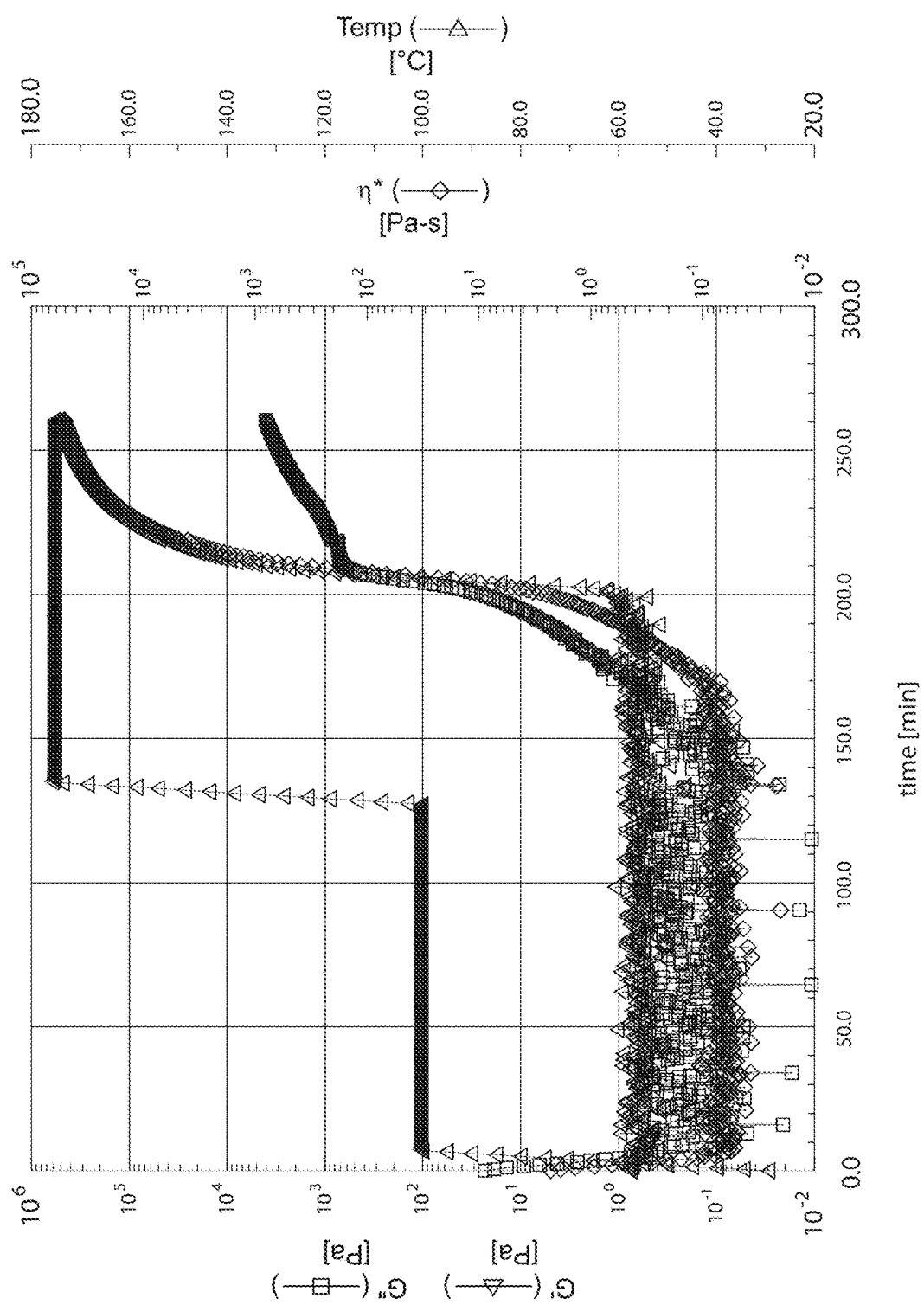
FIG. 4C is a graph showing rheometer results for dry DER 331 mixed with ethacure 100 ketimine protected from MIBK.
Figure 4D:
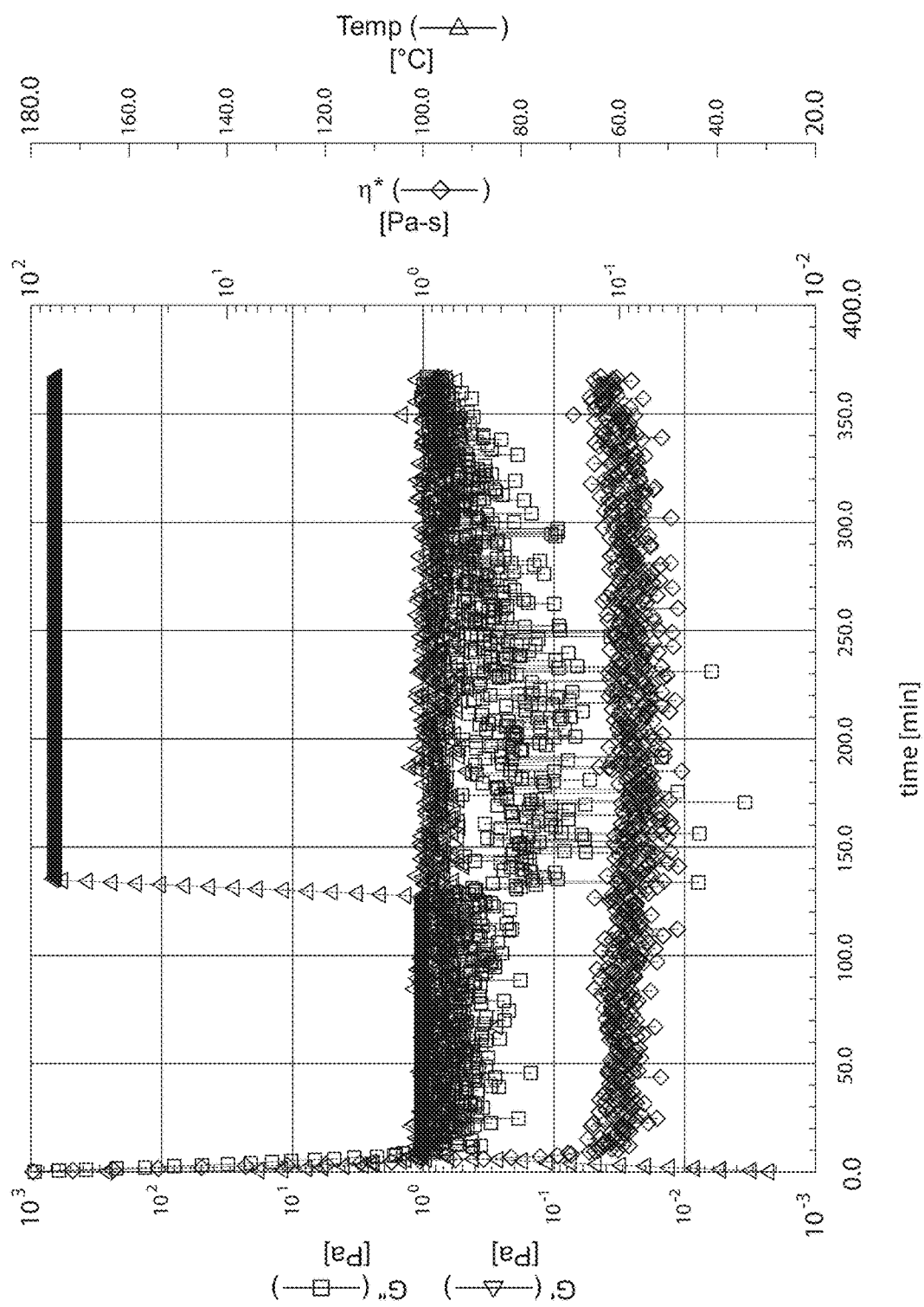
FIG. 4D is a graph showing rheometer results for dry DER 331 mixed with ethacure 100 aldimine protected from p-tolualdehyde.

The traces from the rheometer in FIGS. 4A-D show the trends for viscosity ($\eta^*$), storage-modulus (G') and loss-modulus (G") for DER 331 epoxy alone (FIG. 4A) and when mixed with an equal molar stoichiometric amount of active ethacure 100 hardener (FIG. 4B), inactive ethacure 100 ketimine (FIG. 4C), and inactive ethacure 100 aldimine (FIG. 4D). All four variables, the viscosity ($\eta^*$), storage-modulus (G'), loss-modulus (G"), and temperature are functions of time and are shown on the x-axis. Neat DER 331 (FIG. 4A) shows no signs of vitrification during the entire cure cycle confirming that it does not self-polymerize and gives further credibility to the experimental results. The unprotected ethacure 100 (FIG. 4B) shows a steady increase in all three parameters at 100° C. then all parameters spike immediately after the temperature is raised to 175° C. This spike overloads the torque sensor ending the test at 140 min; the sample vitrified (viscosity>40 kPa-s). The protected ethacure 100 ketimine (FIG. 4C) showed no signs of vitrification during the 100° C. heating phase and showed a slow curing progression over approximately three hours before the rheometer reached the torque limit after 330 min of total cure time. The inactive ethacure 100 aldimine (FIG. 4D) showed only slight advancement of the polymer near the end of the curing cycle. The ethacure 100 aldimine remained within the rheometer load limit and was manually stopped after 6 h. The rheometer tests showed that the imine group reduced the extent of the epoxy polymerization in the case of the ketimine, and almost completely blocks polymerization in the case of the aldimine.

Catalytic amounts (0.01 mol) of imidazole or acidic alumina were added to protected resins to study their effect on cure cycle. The rheometer trace from ethacure 100 ketimine mixed with DER 331 and imidazole (FIG. 5A) showed signs of advancement during the first heating phase at 100° C. All parameters steadily rose during the first heating phase and when the second heating phase began at 175° C., all of the parameters continued to increase at a faster rate. After 215 minutes, the rheometer overloaded and the experiment was stopped. The rheometer trace from the ethacure 100 ketimine with DER 331 and acidic alumina (FIG. 5B) as a catalyst, showed no signs of advancement at 100° C. At 175° C., all of the parameters began to increase at a steady rate and continued to progress slowly until the machine overloaded 7 minutes after completing the standard curing cycle.

Figure 6A:
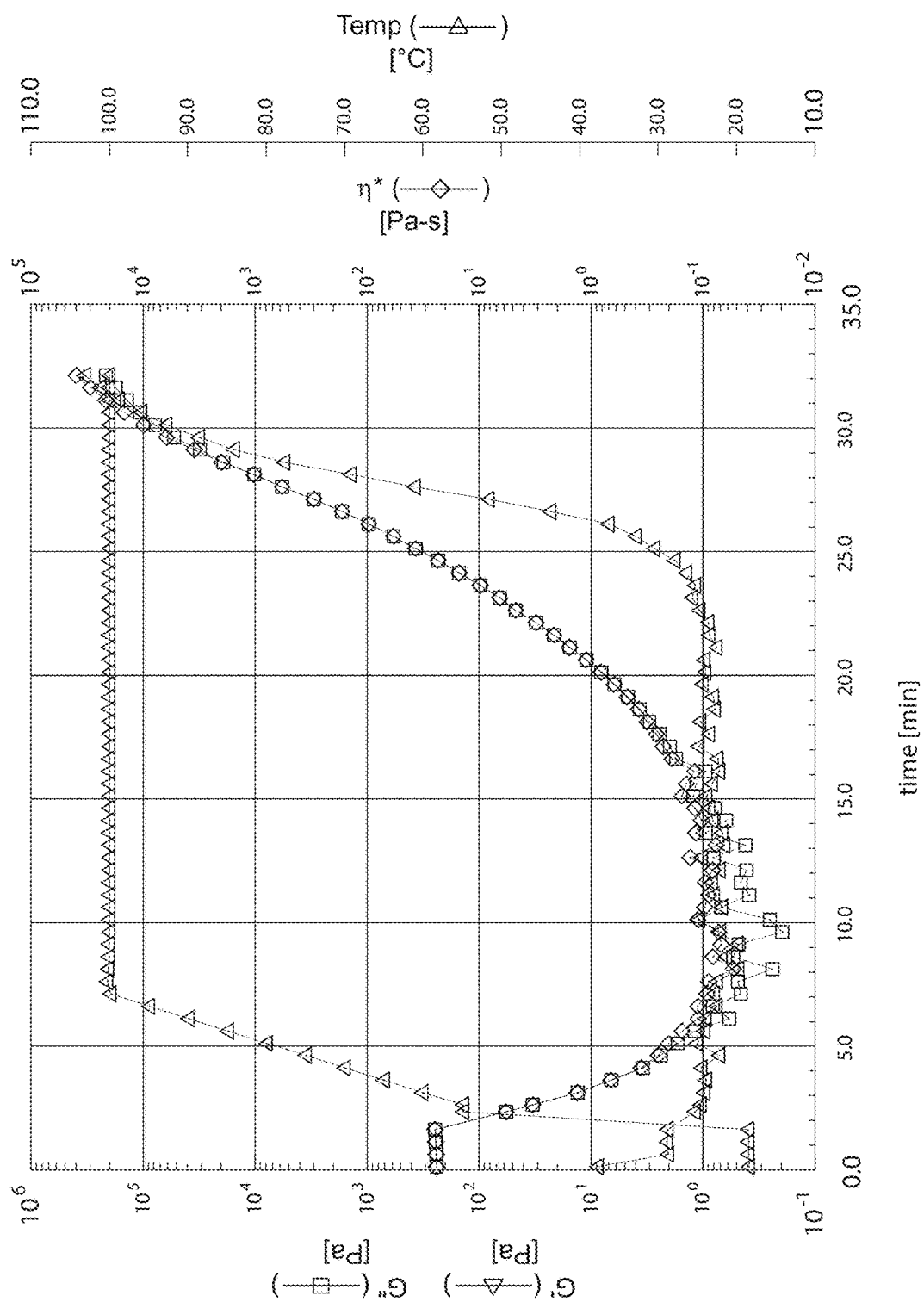
FIG. 6A is a graph showing rheometer results for active m-phenylenediamine when mixed with dry DER 331.
Figure 6B:
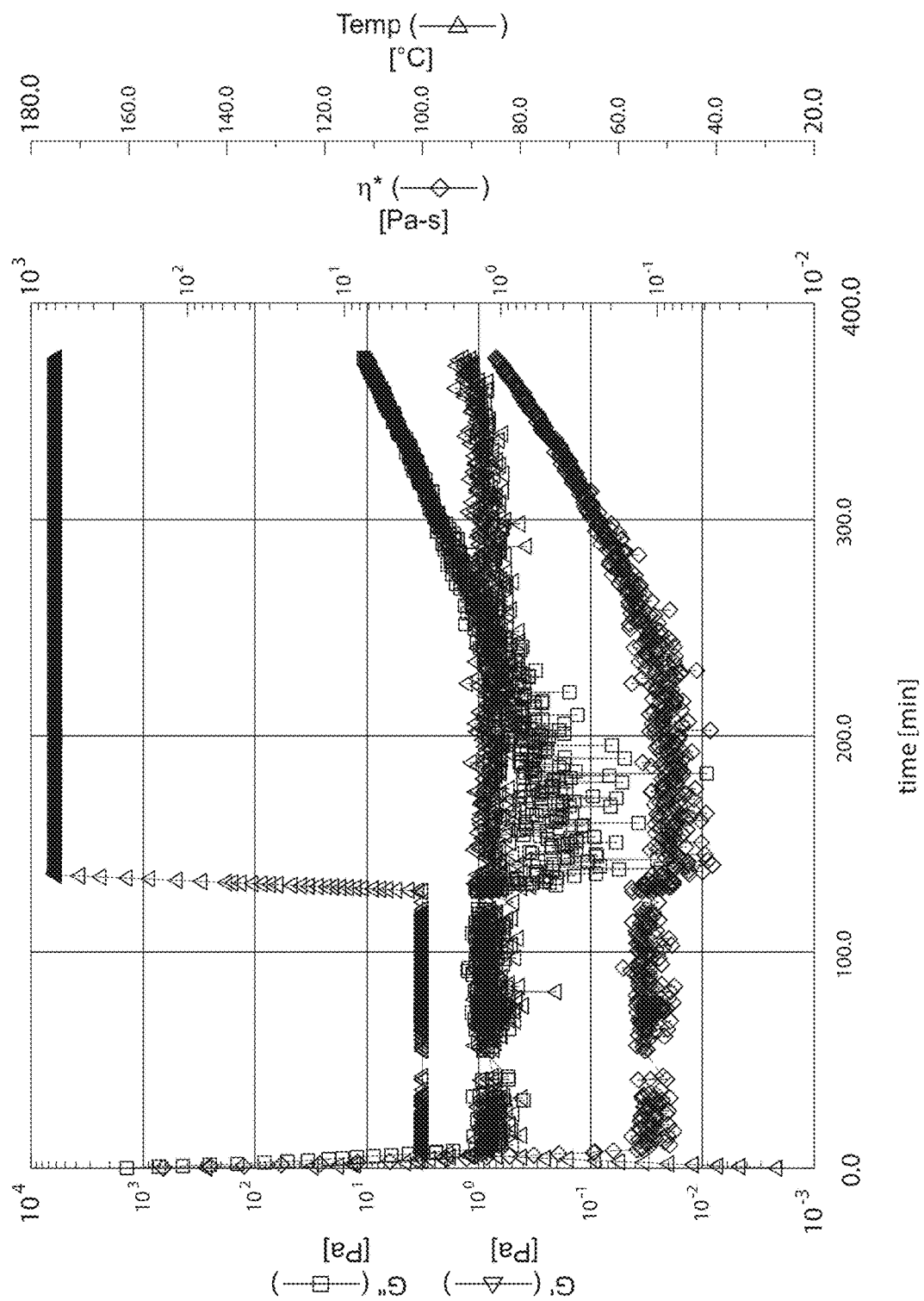
FIG. 6B is a graph showing rheometer results for active m-phenylenediamine aldimine protected from p-tolualdehyde when mixed with dry DER 331.

The active m-phenylenediamine (FIG. 6A) showed all parameters quickly increase at 100° C. overloading the machine at the 33 minute mark. The m-phenylenediamine aldimine (FIG. 6B) shows all parameters remained constant at 100° C. As the temperature increased to 175° C., a slow curing process can be observed. However, the rate of polymerization is not quick enough to overload the rheometer within the curing cycle time frame. The rheometer showed that polymerization was slowed or did not occur when an inactive hardener was mixed with an epoxy.

Example 7—Differential Scanning Calorimetry

After completing the full cure cycle, samples from the rheometer were opened and immediately tested in the Differential Scanning calorimeter (DSC). The glass transition temperature ($T_g$) is the temperature where a material transitions between a glassy, amorphous solid state and a rubbery state. Vitrification is identified as the point at which $T_g$ becomes equal to the increasing curing temperature $T_{cure}$. In cases where the $T_{cure}$ exceeds the $T_g$ of the vitrified resin, devitrification occurs and the resin will result in having a reduced $T_g$. The suppression of the $T_g$ value is important in confirming that the progression of polymerization has been stopped or slowed. This is because as polymerization occurs the molecular weight increases causing a proportional increase of the $T_g$ value. A cured resin with a low $T_g$, can be handled safely and only needs to be heated in order to be a component in the co-cure method. The $T_g$ values in Table 3 were measured in a DSC at a heating rate of 20° C. min$^{-1}$.

TABLE 3

Glass transition temperatures of DER 331 epoxy with various hardeners after the standard cure cycle.

| Hardener/Catalyst mixed with DER 331 | $T_g$ (° C.) |
| --- | --- |
| Ethacure 100 (control) | 173 |
| Ethacure 100 ketimine | 45 |
| Ethacure 100 ketimine, acidic alumina | 80 |
| Ethacure 100 ketimine, imidazole | 108 |
| Ethacure 100 aldimine | 30 |
| m-phenylenediamine (control) | 161 |
| m-phenylenedialdimine | 43 |

In good correlation with the rheometer, the DSC showed a large suppression (128° C.) of the $T_g$ for the ethacure 100 ketimine (45° C.) relative to the active form (173° C.). The acidic alumina rheology was an improvement to the ethacure 100 ketimine, but the $T_g$ was suppressed to a lesser extent (93° C.). Imidazole caused vitrification of the inhibited resin, but the resulting $T_g$ value (108° C.) was lower than the control. When ethacure 100 aldimine was used there was the largest recorded $T_g$ suppression (133° C.). Phenylenediamine aldimine suppressed (118° C.) the $T_g$ to 43° C. relative to the $T_g$ of phenylenediamine (161° C.).

Preliminary demonstrations of the off-set stoichiometry method were conducted using the commercial diamine hardener (Ethacure 100 from Albermarle Corporation) and the commercial diepoxide (DER331 from Dow Chemical Company). The off-set ratio (r=molar equivalents of amine/molar equivalents of epoxide) was r=0.3 for the HP resin and r=3.33 for the HR resin. Upon mixing equal masses of these HP and HR resins, the ratio becomes r~1, i.e., no offset. These resins were polymerized to the reagent limiting endpoint of the reaction and then dissolved in methyl ethyl ketone. Prepreg was prepared from the solutions of off-set resins using un-sized, IM7 carbon fiber. The prepreg was then laid up with commercial pregreg T800H/3900-2 from Toray America to make 12' by 12', 10 ply, flat panels. The fully cured panels were then joined in a secondary, co-cure autoclave process. The joined panels were machined into specimens and tested for interlaminar fracture toughness at the joint between the HP and HR lamellae. The fracture toughness indicated that the HP and HR intermixed across the interface. Failure mode inspections indicated that the crack propagated away from the interlaminar resin and into the fiber bed of the hardener rich prepreg layers. This indicates that mixing and advancement of the polymer occurred at the interface which increased polymer mechanical properties and drove the crack to follow a weaker path through the fiber bed.

Figure 9:
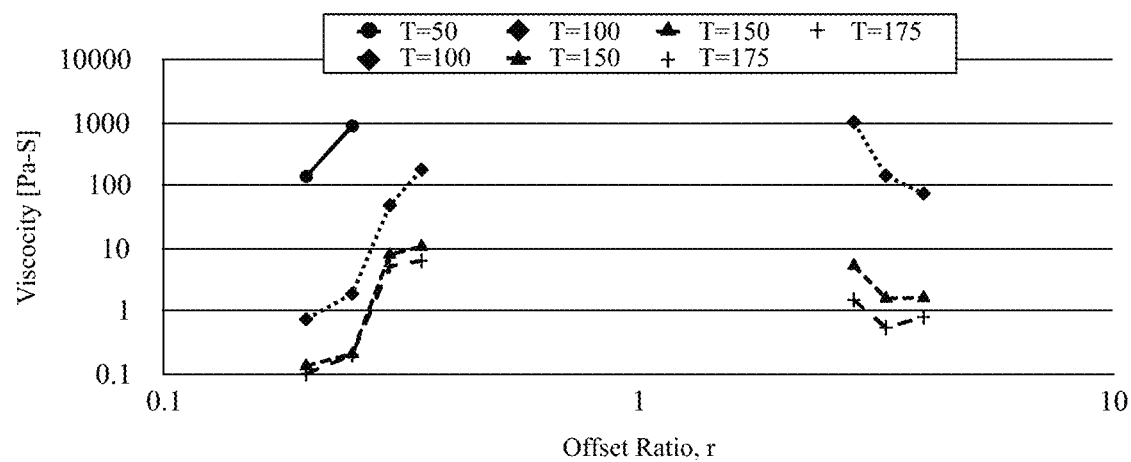
FIG. 9 is a graph showing the viscosity of offset polymers measured at various temperatures.

Referring to FIG. 9, the viscosity of offset polymers measured at various temperatures are given as depicted in the legend in ° C. The melt viscosities measured from a series of offset resins are presented in FIG. 9. The viscosity of the polymer melt increases for both HR and HP resin formulations as r approaches unity. Polymer melts were obtained for polymers with r=0.33 to 3.0, which should theoretically result in gels. The retention of flow properties at elevated temperature indicate limited molecular weight development of the offset resins tested.

Figure 10:
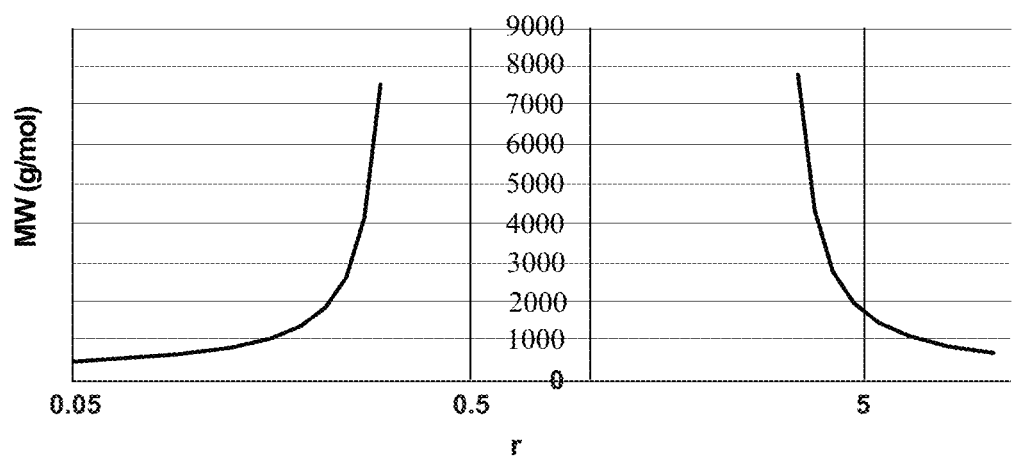
FIG. 10 is graph showing molecular weights for full conversion of the limiting functional group for various stoichiometric offsets.

Referring to FIG. 10, the predicted molecular weights for full conversion of the limiting functional group for various stoichiometric offsets. FIG. 10 represents the theoretical molecular weights for a range of r values less than and greater than the gelation range. The experimental viscosity data in FIG. 9 correlate well with the calculated molecular weights.

Figure 11:
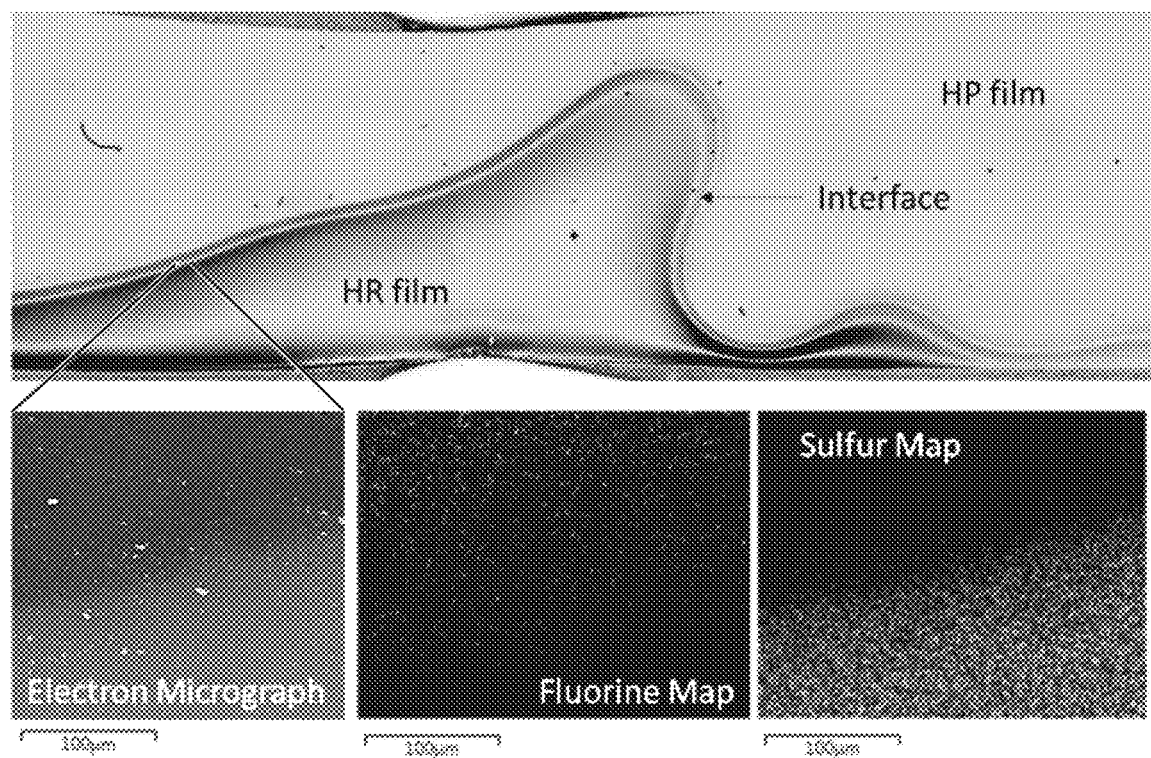
FIG. 11 shows the interface between hardener rich and hardener poor regions of co-cured prepreg layers.

Referring to FIG. 11, the interface between the HR and HP layers is visible in an optical micrograph (top) due to the dark color of the sulfur containing hardener in the HR film. A scanning electron micrograph shows an interface across which fluorine and sulfur containing hardeners migrated. Energy dispersive X-ray spectroscopy (EDS) was used to map the concentration of fluorine and sulfur atoms across the interface. The EDS maps were used to determine diffusion distance of the HP and HR film across the interface. Lamination of neat resin films with respective r values of 0.33 and 3.0 resulted in a monolithic polymer layer. For samples prepared without heteroatom (sulfur or fluorine) containing hardeners, the interfaces were not optically visible. Adding the heteroatom containing hardeners made the interface discernable in the optical microscope and allowed for measurement of the interdiffusion of fluorine and sulfur containing layers using EDS and electron microscopy (FIG. 11). The total interdiffusion distance of the two labeled hardeners was approximately 100-200 microns.

Figure 12:
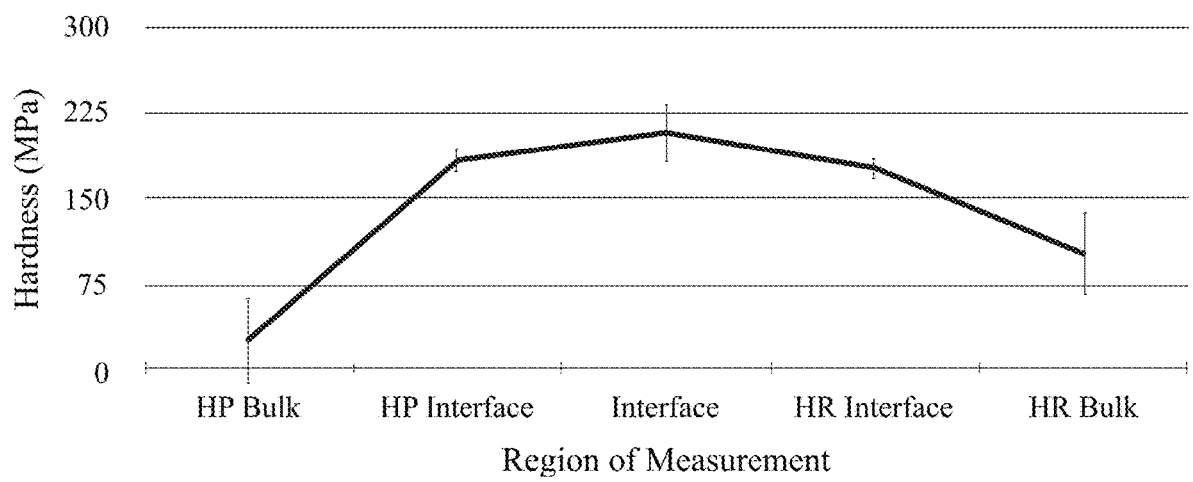
FIG. 12 is a graph showing the hardness measured by microindentation from the cross-section of the co-cured prepreg layers shown in FIG. 11.

Referring to FIG. 12, the hardness measured by microindentation from the cross-section of co-cured, neat resin films with r=0.33 (HP) and r=3.0 (HR). Bulk measurements are made far from the interface. Microindenter hardness measured on neat resin plaques (without heteroatom containing hardeners) is shown in FIG. 12. The hardness of the bulk HR and HP resins was increased significantly at the interface which indicates mixing of the complimentary resins. The distance from the "HP Interface" to the "HR Interface" measurement points was about 100 to 150 microns which correlates well with interdiffusion distance measured by SEM/EDS. In comparison, a single prepreg sheet is commonly 125 to 200 microns thick. Assuming the effect of fiber on polymer diffusion and mixing is negligible, a single layer of offset prepreg should mix and substantially advance the polymer during the secondary co-cure.

The fracture toughness during propagation (Gr) is shown in Table 4 for the layups and cure cycles also given in Table 4. The low fracture toughness for layup 1, which had only one ply of HR and HP prepregs at the interface, was attributed to mixing of the off-set resin with Toray resin from the bulk laminate. The fracture toughness was substantially greater for layup 2 which contained two plys of offset prepreg at the interface. Layup 2 also had a greater fracture toughness than the commercial laminate material ($G_P$<700 J/m$^2$). The high value obtained for layup 2 is extensive fiber bridging that occurred as the crack followed the weakest path through the fiber bed on the HR side of the interface. Incomplete mixing of HR and HP resins within the fiber bed may have resulted in weak/brittle resin within the fiber bed of the HR layers. Because the crack was forced to propagate through the fiber bed, the fracture toughness was substantially increased in spite of incomplete mixing and polymerization away from the interface. The lower values obtained for layups 3 and 4 may indicate that the r values tested resulted in gelled polymers during the primary co-cure which had reduced mobility and intermixing during the secondary co-cure.

TABLE 4

Interlaminar fracture toughness (propagation values) of secondary-co-cured panels.

| Layup | Cure Cycle | $G_P$ (J/m$^2$) |
|---|---|---|
| 1. [Toray$_9$/R = 3.3$_1$/R = 0.3$_1$/Toray$_9$] | a | 179 ± 59 |
| 2. [Toray$_8$/R = 3.3$_2$/R = 0.3$_2$/Toray$_8$] | a | 851 ± 141 |
| 3. [Toray$_8$/R = 2.85$_2$/R = 0.35$_2$/Toray$_8$] | a | 404 ± 12 |
| 4. [Toray$_8$/R = 2.85$_2$/R = 0.35$_2$/Toray$_8$] | b | 179 ± 48 |

What is claimed is:

1. A method for bonding composite substrates comprising:
    providing a first composite substrate and a second composite substrate wherein both the first and second composite substrates comprise one or more reinforcement fibers and a first curable resin;
    coupling a first co-cure prepreg layer having a first off-set amine to epoxide molar ratio onto a surface of the first composite substrate;
    coupling a second co-cure prepreg layer having a second off-set amine to epoxide molar ratio onto a surface of the second composite substrate;
    curing both the first and second composite substrates to the first and second co-cure prepreg layers, respectively, at a first curing cycle to form a first and a second co-cure prepreg layer portion wherein the first and second composite substrates are fully cured and the first and second co-cure prepreg layer portions are partially cured;
    coupling the first co-cure prepreg layer portion of the first composite substrate to the second co-cure prepreg layer portion of the second composite substrate; and
    applying a second curing cycle to cure the first co-cure prepreg layer portion of the first composite substrate to the second co-cure prepreg layer portion of the second composite substrate to form a monolithic covalently bonded composite structure.

2. The method of claim 1, further comprising
    applying a first reflow temperature to the first and second co-cure prepreg layer coupled to the first and second composite substrates before curing at the first temperature.

3. The method of claim 1, further comprising
    applying a second reflow temperature to the coupled first and second co-cure prepreg layer portions before curing at the second temperature.

4. The method of claim 1, wherein the first curing cycle is from about 75° C. to about 250° C. and the second curing cycle is from about 75° C. to about 250° C.

5. The method of claim 1, wherein the first curable resin comprises an epoxide and an amine.

6. The method of claim 1, wherein the first off-set amine to epoxide molar ratio of the first co-cure prepreg layer is about 0.3.

7. The method of claim 1, wherein the second off-set amine to epoxide molar ratio of the second co-cure prepreg layer is about 3.3.

8. The method of claim 1, wherein the first curable resin comprises a diepoxide and a diamine.

9. The method of claim 8, wherein the diamine is 4,6-diethyl-2-methylbenzene-1,3-diamine.

10. The method of claim 1, wherein the first off-set amine to epoxide ratio of the first co-cure prepreg layer is less than about 0.3 and the second off-set amine to epoxide ratio of the second co-cure prepreg layer is greater than about 3.3.

11. A method for bonding composite substrates comprising:
    providing a first co-cure prepreg layer portion cured to a surface of a first composite substrate wherein the first co-cure prepreg layer portion includes a first off-set amine to epoxide molar ratio less than about 0.3;
    providing a second co-cure prepreg layer portion cured to a surface of a second composite substrate wherein the second co-cure prepreg layer portion includes a second off-set amine to epoxide molar ratio greater than about 3.3;
    coupling the first co-cure prepreg layer portion cured to the first composite substrate to the second co-cure prepreg layer portion cured to the second composite substrate;
    applying a reflow temperature to the coupled first and second co-cure prepreg layer portions; and
    applying a second temperature to couple the first co-cure prepreg layer portion of the first composite substrate to the second co-cure prepreg layer portion of the second composite substrate to form a monolithic covalently bonded composite structure.

12. The method of claim 11, wherein the first off-set amine to epoxide molar ratio of the first co-cure prepreg layer portion is about 0.3.

13. The method of claim 11, wherein the second off-set amine to epoxide molar ratio of the second co-cure prepreg layer portion is about 3.3.

14. The method of claim 11, wherein the first and second composite substrates comprise one or more reinforcement fibers.

15. The method of claim 11, wherein the first and second co-cure prepreg layer portions comprise a diepoxide and a diamine.

16. The method of claim 11, wherein the first and second co-cure prepreg layer portions comprise a 4,6-diethyl-2-methylbenzene-1,3-diamine.

17. The method of claim 11, wherein the monolithic covalently bonded composite structure comprises a cross-linked amine-cured epoxy polymer network.

18. A co-curable composite structure comprising:
a first uncured or partially cured composite substrate comprising one or more reinforcement fibers and a first curable resin wherein the first curable resin comprises an epoxide and an amine; and
a first co-cure prepreg layer coupled to a surface of the first uncured or partially cured composite substrate wherein the first co-cure prepreg layer comprises an off-set amine to epoxide ratio of about 5 to about 100;
wherein the first uncured or partially cured composite substrate and the first co-cure prepreg layer are cured together at a first curing cycle until the first uncured or partially cured composite substrate and the first co-cure prepreg layer are cured to form the co-curable composite structure.

19. The co-curable composite structure of claim 18, wherein the off-set amine to epoxide molar ratio of the co-cure prepreg layer is about 5 to about 10.

20. The co-curable composite structure of claim 18, wherein the off-set amine to epoxide molar ratio of the co-cure prepreg layer is about 5 to about 6.6.

* * * * *